United States Patent
Kimble et al.

(10) Patent No.: US 9,215,423 B2
(45) Date of Patent: Dec. 15, 2015

(54) RECOMMENDATION ENGINE APPARATUS AND METHODS

(75) Inventors: David Kimble, Boulder, CO (US); Fee Ling Chin, Lafayette, CO (US)

(73) Assignee: TIME WARNER CABLE ENTERPRISES LLC, New York, NY (US)

(*) Notice: Subject to any disclaimer, the term of this patent is extended or adjusted under 35 U.S.C. 154(b) by 1440 days.

(21) Appl. No.: 12/414,576

(22) Filed: Mar. 30, 2009

(65) Prior Publication Data

US 2010/0251305 A1 Sep. 30, 2010

(51) Int. Cl.
| | | |
|---|---|---|
| *H04N 7/173* | (2011.01) | |
| *H04N 21/258* | (2011.01) | |
| *H04N 21/2668* | (2011.01) | |
| *H04N 21/466* | (2011.01) | |
| *H04N 21/482* | (2011.01) | |
| *H04N 21/658* | (2011.01) | |

(52) U.S. Cl.
CPC ..... *H04N 7/17318* (2013.01); *H04N 21/25891* (2013.01); *H04N 21/2668* (2013.01); *H04N 21/466* (2013.01); *H04N 21/4667* (2013.01); *H04N 21/4668* (2013.01); *H04N 21/4826* (2013.01); *H04N 21/6582* (2013.01)

(58) Field of Classification Search
USPC .......................................................... 725/46
See application file for complete search history.

(56) References Cited

U.S. PATENT DOCUMENTS

| | | | |
|---|---|---|---|
| 5,410,344 A * | 4/1995 | Graves et al. .................... | 725/46 |
| 5,528,284 A | 6/1996 | Iwami et al. | |
| 5,534,911 A | 7/1996 | Levitan | |
| 5,557,319 A | 9/1996 | Gurusami et al. | |
| 5,708,961 A | 1/1998 | Hylton et al. | |

(Continued)

FOREIGN PATENT DOCUMENTS

| | | |
|---|---|---|
| JP | A-2005-519365 | 6/2005 |
| JP | A-2005-519501 | 6/2005 |

(Continued)

OTHER PUBLICATIONS

UTF-32, IBM, retrieved from http://publib.boulder.ibm.com/infocenter/iseries/v5r3/index.jsp?topic=%2Fnls%2Frbagsutf32.htm.on Aug. 28, 2013.
Security Assertion Markup language (SAML) Specification (Version 2.0 released in 2005), as SAML Core: S. Cantor et al. Assertions and Protocols for the OASIS Security Assertion Markup Language (SAML) V2.0. OASIS Standard, Mar. 2005. Document ID saml-core-2.0-os (http://docs.oasis-open.org/security/saml/v2.0/saml-core-2.0-os.pdf).
SAML Binding: S. Cantor et al. Bindings for the OASIS Security Assertion Markup Language (SAML) V2.0. OASIS Standard, Mar. 2005. Document ID saml-bindings-2.0-os (http://docs.oasis-open.org/security/saml/v2.0/saml-bindings-2.0-os.pdf).

(Continued)

*Primary Examiner* — Fernando Alcon
(74) *Attorney, Agent, or Firm* — Gazdzinski & Associates, PC

(57) ABSTRACT

Recommendation engine apparatus and associated methods provide content compiled from various sources and selected to match user preferences. In one embodiment, the recommendation apparatus comprises a headend entity; in another, it is co-located on a user's CPE. In one embodiment, the recommendation engine creates content records from content metadata for comparison to a user profile. The user profile is pre-programmed; however has the ability to dynamically shift toward a user's preferences as the user takes actions regarding content. Client applications are utilized to compile and present content; feedback mechanisms are utilized to enable "learning" from user activities to generate more precise recommendations as well as to "unlearn" stale preferences. Recommended content is displayed in the form of a playlist, or as a continuous stream on a virtual channel, or presented in an electronic program guide. A business rules "engine" useful in implementing operational or business goals is also disclosed.

27 Claims, 21 Drawing Sheets

(56) References Cited

U.S. PATENT DOCUMENTS

| | | |
|---|---|---|
| 5,745,837 A | 4/1998 | Fuhnnann |
| 5,758,257 A * | 5/1998 | Herz et al. .................... 725/116 |
| 5,818,438 A | 10/1998 | Howe et al. |
| 5,822,530 A | 10/1998 | Brown |
| 5,838,921 A | 11/1998 | Speeter |
| 5,897,635 A | 4/1999 | Torres et al. |
| 5,940,738 A | 8/1999 | Rao |
| 5,999,525 A | 12/1999 | Krishnaswamy et al. |
| 5,999,535 A | 12/1999 | Wang et al. |
| 6,125,397 A | 9/2000 | Yoshimura et al. |
| 6,167,432 A | 12/2000 | Jiang |
| 6,181,697 B1 | 1/2001 | Nurenberg et al. |
| 6,219,710 B1 | 4/2001 | Gray et al. |
| 6,233,389 B1 | 5/2001 | Barton et al. |
| 6,259,701 B1 | 7/2001 | Shur et al. |
| 6,317,884 B1 | 11/2001 | Eames et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,473,793 B1 | 10/2002 | Dillon et al. |
| 6,519,062 B1 | 2/2003 | Yoo |
| 6,523,696 B1 | 2/2003 | Saito et al. |
| 6,546,016 B1 | 4/2003 | Gerszberg et al. |
| 6,564,381 B1 | 5/2003 | Hodge et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,694,145 B2 | 2/2004 | Riikonen et al. |
| 6,711,742 B1 | 3/2004 | Kishi et al. |
| 6,718,552 B1 | 4/2004 | Goode |
| 6,748,395 B1 | 6/2004 | Picker et al. |
| 6,754,904 B1 | 6/2004 | Cooper et al. |
| 6,757,906 B1 | 6/2004 | Look et al. |
| 6,774,926 B1 | 8/2004 | Ellis et al. |
| 6,788,676 B2 | 9/2004 | Partanen et al. |
| 6,847,778 B1 | 1/2005 | Vallone et al. |
| 6,909,726 B1 | 6/2005 | Sheeran |
| 6,918,131 B1 | 7/2005 | Rautila et al. |
| 6,925,257 B2 | 8/2005 | Yoo |
| 6,931,018 B1 | 8/2005 | Fisher |
| 6,934,964 B1 | 8/2005 | Schaffer et al. |
| 6,944,150 B1 | 9/2005 | McConnell et al. |
| 6,978,474 B1 | 12/2005 | Sheppard et al. |
| 7,006,881 B1 | 2/2006 | Hoffberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,146,627 B1 | 12/2006 | Ismail et al. |
| 7,149,772 B1 | 12/2006 | Kalavade |
| 7,167,895 B1 * | 1/2007 | Connelly .................... 709/203 |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1 | 2/2007 | Ellis et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et al. |
| 7,228,556 B2 | 6/2007 | Beach et al. |
| 7,242,960 B2 | 7/2007 | Van Rooyen |
| 7,254,608 B2 | 8/2007 | Yeager et al. |
| 7,257,106 B2 | 8/2007 | Chen et al. |
| 7,260,823 B2 | 8/2007 | Schlack et al. |
| 7,293,276 B2 | 11/2007 | Phillips et al. |
| 7,312,391 B2 | 12/2007 | Kaiser et al. |
| 7,325,043 B1 | 1/2008 | Rosenberg et al. |
| 7,325,073 B2 | 1/2008 | Shao et al. |
| 7,330,483 B1 | 2/2008 | Peters et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,762 B2 | 3/2008 | Kim |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,382,786 B2 | 6/2008 | Chen |
| 7,457,520 B2 | 11/2008 | Rossetti et al. |
| 7,486,869 B2 | 2/2009 | Alexander |
| 7,532,712 B2 | 5/2009 | Gonder |
| 7,548,562 B2 | 6/2009 | Ward et al. |
| 7,567,983 B2 | 7/2009 | Pickelsimer |
| 7,571,452 B2 | 8/2009 | Gutta |
| 7,592,912 B2 | 9/2009 | Hasek et al. |
| 7,602,820 B2 | 10/2009 | Helms et al. |
| 7,609,637 B2 | 10/2009 | Doshi et al. |
| 7,624,337 B2 | 11/2009 | Sull et al. |
| 7,690,020 B2 | 3/2010 | Lebar |
| 7,693,171 B2 | 4/2010 | Gould |
| 7,721,314 B2 | 5/2010 | Sincaglia et al. |
| 7,742,074 B2 | 6/2010 | Minatogawa |
| 7,809,942 B2 | 10/2010 | Baran et al. |
| 7,900,052 B2 | 3/2011 | Jonas |
| 7,916,755 B2 | 3/2011 | Hasek et al. |
| 7,936,775 B2 | 5/2011 | Iwamura |
| 7,954,131 B2 | 5/2011 | Cholas et al. |
| 8,170,065 B2 | 5/2012 | Hasek et al. |
| 8,281,352 B2 | 10/2012 | Brooks et al. |
| 8,347,341 B2 | 1/2013 | Markley et al. |
| 8,429,702 B2 | 4/2013 | Yasrebi et al. |
| 8,516,529 B2 | 8/2013 | Lajoie et al. |
| 8,520,850 B2 | 8/2013 | Helms et al. |
| 2001/0004768 A1 | 6/2001 | Hodge et al. |
| 2001/0050945 A1 | 12/2001 | Lindsey |
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0053076 A1 * | 5/2002 | Landesmann .................... 725/10 |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0083451 A1 * | 6/2002 | Gill et al. .................... 725/46 |
| 2002/0087995 A1 | 7/2002 | Pedlow, Jr. |
| 2002/0144267 A1 | 10/2002 | Gutta et al. |
| 2002/0147771 A1 | 10/2002 | Traversat et al. |
| 2002/0152091 A1 | 10/2002 | Nagaoka et al. |
| 2002/0152299 A1 | 10/2002 | Traversat et al. |
| 2002/0188744 A1 | 12/2002 | Mani |
| 2002/0188869 A1 | 12/2002 | Patrick et al. |
| 2003/0005453 A1 | 1/2003 | Rodrigues et al. |
| 2003/0028451 A1 | 2/2003 | Ananian |
| 2003/0056217 A1 | 3/2003 | Brooks et al. |
| 2003/0093794 A1 | 5/2003 | Thomas et al. |
| 2003/0115267 A1 | 6/2003 | Hinton et al. |
| 2003/0163443 A1 | 8/2003 | Wang |
| 2003/0165241 A1 | 9/2003 | Fransdonk |
| 2003/0166401 A1 | 9/2003 | Combes et al. |
| 2003/0208767 A1 | 11/2003 | Williamson et al. |
| 2003/0217137 A1 | 11/2003 | Roese et al. |
| 2003/0217365 A1 | 11/2003 | Caputo et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0117254 A1 | 6/2004 | Nemirofsky |
| 2004/0133923 A1 | 7/2004 | Watson et al. |
| 2004/0137918 A1 | 7/2004 | Varonen et al. |
| 2004/0166832 A1 | 8/2004 | Portman et al. |
| 2004/0230994 A1 | 11/2004 | Urdang et al. |
| 2004/0250273 A1 | 12/2004 | Swix et al. |
| 2005/0034171 A1 | 2/2005 | Benya |

(56) References Cited

U.S. PATENT DOCUMENTS

| | | |
|---|---|---|
| 2005/0049886 A1 | 3/2005 | Grannan et al. |
| 2005/0055220 A1 | 3/2005 | Lee et al. |
| 2005/0055729 A1 | 3/2005 | Atad et al. |
| 2005/0086334 A1 | 4/2005 | Aaltonen et al. |
| 2005/0086683 A1 | 4/2005 | Meyerson et al. |
| 2005/0108763 A1 | 5/2005 | Baran et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0289618 A1 | 12/2005 | Hardin |
| 2006/0020786 A1 | 1/2006 | Helms |
| 2006/0021004 A1 | 1/2006 | Moran et al. |
| 2006/0041915 A1 | 2/2006 | Dimitrova et al. |
| 2006/0047957 A1 | 3/2006 | Helms et al. |
| 2006/0095940 A1 | 5/2006 | Yearwood |
| 2006/0117379 A1 | 6/2006 | Bennett et al. |
| 2006/0130099 A1 | 6/2006 | Rooyen |
| 2006/0130101 A1 | 6/2006 | Wessel van Rooyen |
| 2006/0130107 A1 | 6/2006 | Gonder |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0149850 A1 | 7/2006 | Bowman |
| 2006/0156392 A1 | 7/2006 | Baugher |
| 2006/0161635 A1 | 7/2006 | Lamkin et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218604 A1 | 9/2006 | Riedl et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0025372 A1 | 2/2007 | Brenes et al. |
| 2007/0033531 A1 | 2/2007 | Marsh et al. |
| 2007/0049245 A1 | 3/2007 | Lipman |
| 2007/0053513 A1 | 3/2007 | Hoffberg |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0094691 A1 | 4/2007 | Gazdzinski |
| 2007/0118848 A1 | 5/2007 | Schwesinger et al. |
| 2007/0121578 A1 | 5/2007 | Annadata et al. |
| 2007/0121678 A1 | 5/2007 | Brooks |
| 2007/0124488 A1 | 5/2007 | Baum et al. |
| 2007/0153820 A1 | 7/2007 | Gould |
| 2007/0154041 A1 | 7/2007 | Beauchamp |
| 2007/0180230 A1 | 8/2007 | Cortez |
| 2007/0204300 A1 | 8/2007 | Markley |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0226365 A1 | 9/2007 | Hildreth et al. |
| 2007/0250880 A1 | 10/2007 | Hainline |
| 2007/0261116 A1 | 11/2007 | Prafullchandra et al. |
| 2007/0276925 A1 | 11/2007 | La Joie |
| 2007/0276926 A1 | 11/2007 | La Joie et al. |
| 2007/0294717 A1 | 12/2007 | Hill et al. |
| 2007/0294738 A1 | 12/2007 | Kuo et al. |
| 2007/0299728 A1 | 12/2007 | Nemirofsky |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0086750 A1* | 4/2008 | Yasrebi et al. ............... 725/86 |
| 2008/0091805 A1 | 4/2008 | Malaby et al. |
| 2008/0091807 A1 | 4/2008 | Strub et al. |
| 2008/0092181 A1 | 4/2008 | Britt et al. |
| 2008/0098212 A1 | 4/2008 | Helms et al. |
| 2008/0098450 A1 | 4/2008 | Wu et al. |
| 2008/0112405 A1 | 5/2008 | Cholas et al. |
| 2008/0133551 A1 | 6/2008 | Wensley et al. |
| 2008/0137541 A1 | 6/2008 | Agarwal et al. |
| 2008/0155059 A1 | 6/2008 | Hardin |
| 2008/0162353 A1 | 7/2008 | Tom et al. |
| 2008/0192820 A1 | 8/2008 | Brooks |
| 2008/0222684 A1 | 9/2008 | Mukraj et al. |
| 2008/0235746 A1 | 9/2008 | Peters et al. |
| 2008/0273591 A1 | 11/2008 | Brooks |
| 2008/0282299 A1 | 11/2008 | Koat et al. |
| 2008/0320282 A1 | 12/2008 | Morris et al. |
| 2009/0030802 A1 | 1/2009 | Plotnick et al. |
| 2009/0031335 A1 | 1/2009 | Hendricks et al. |
| 2009/0083279 A1 | 3/2009 | Hasek |
| 2009/0083813 A1 | 3/2009 | Dolce et al. |
| 2009/0098861 A1 | 4/2009 | Kalliola et al. |
| 2009/0100459 A1 | 4/2009 | Riedl |
| 2009/0141696 A1 | 6/2009 | Chou et al. |
| 2009/0150917 A1 | 6/2009 | Huffman et al. |
| 2009/0158311 A1 | 6/2009 | Hon et al. |
| 2009/0172776 A1 | 7/2009 | Makagon et al. |
| 2009/0185576 A1 | 7/2009 | Kisel et al. |
| 2009/0187939 A1 | 7/2009 | Lajoie |
| 2009/0193486 A1 | 7/2009 | Patel et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas |
| 2009/0225760 A1 | 9/2009 | Foti |
| 2009/0282241 A1 | 11/2009 | Prafullchandra et al. |
| 2009/0293101 A1 | 11/2009 | Carter et al. |
| 2010/0027560 A1 | 2/2010 | Yang et al. |
| 2010/0030578 A1 | 2/2010 | Siddique et al. |
| 2010/0042478 A1 | 2/2010 | Reisman |
| 2010/0043030 A1 | 2/2010 | White |
| 2010/0083329 A1 | 4/2010 | Joyce et al. |
| 2010/0106846 A1 | 4/2010 | Noldus et al. |
| 2010/0115091 A1 | 5/2010 | Park et al. |
| 2010/0122274 A1 | 5/2010 | Gillies |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0169977 A1 | 7/2010 | Dasher et al. |
| 2010/0217613 A1 | 8/2010 | Kelly et al. |
| 2010/0251304 A1 | 9/2010 | Donoghue |
| 2010/0251305 A1 | 9/2010 | Kimble |
| 2010/0287609 A1 | 11/2010 | Gonzalez et al. |
| 2010/0325547 A1 | 12/2010 | Keng et al. |
| 2011/0071841 A1 | 3/2011 | Fomenko et al. |
| 2011/0090898 A1 | 4/2011 | Patel et al. |
| 2011/0145049 A1 | 6/2011 | Hertel et al. |
| 2011/0173095 A1 | 7/2011 | Kassaei |
| 2011/0213688 A1 | 9/2011 | Santos et al. |
| 2013/0097647 A1 | 4/2013 | Brooks et al. |

FOREIGN PATENT DOCUMENTS

| | | |
|---|---|---|
| JP | A-2005-339093 | 12/2005 |
| JP | A-2008-015936 | 1/2008 |
| JP | A-2009-211632 | 9/2009 |
| JP | A-2010-502109 | 1/2010 |
| JP | A-2010-079902 | 4/2010 |
| JP | A-2012-505436 | 3/2012 |
| JP | A-2012-523614 | 10/2012 |
| WO | WO 01/10125 | 2/2001 |
| WO | WO 2005/015422 | 2/2005 |
| WO | WO 2005/031524 | 4/2005 |
| WO | WO 2005031524 | 4/2005 |
| WO | WO 2007/060451 | 5/2007 |

OTHER PUBLICATIONS

Enhanced TV Binary Interchange, Format 1.0 OC-SP-ETV-BIF1.0-104-070921 Date: Sep. 21, 2007, 420 pages.

"Select a Channel to start watching", Videophiles: Curate your own online video channel with expressive easy to use tools; © 2014 Redux, Inc. All rights reserved; http://www.redux.com/; 2 pages.

* cited by examiner

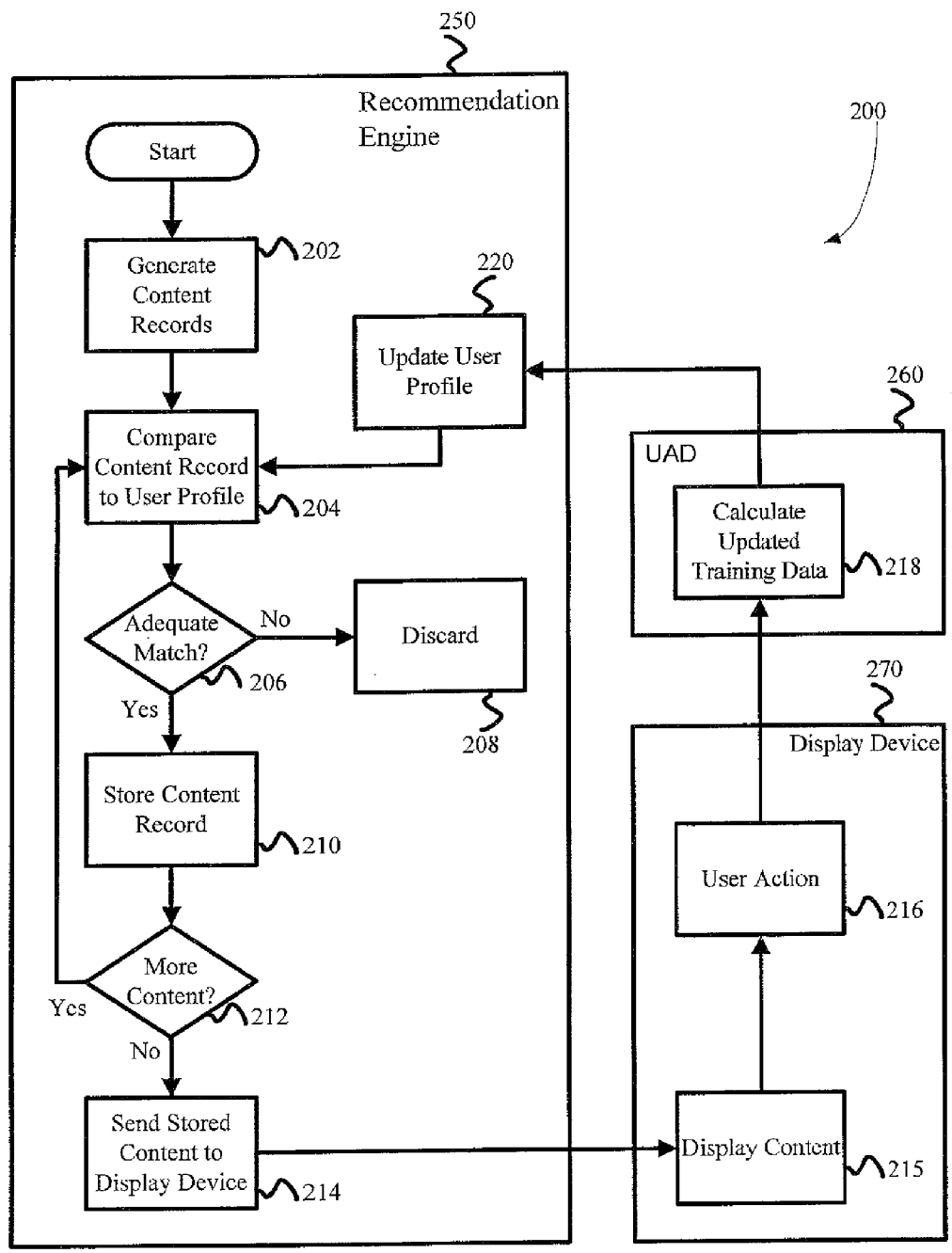

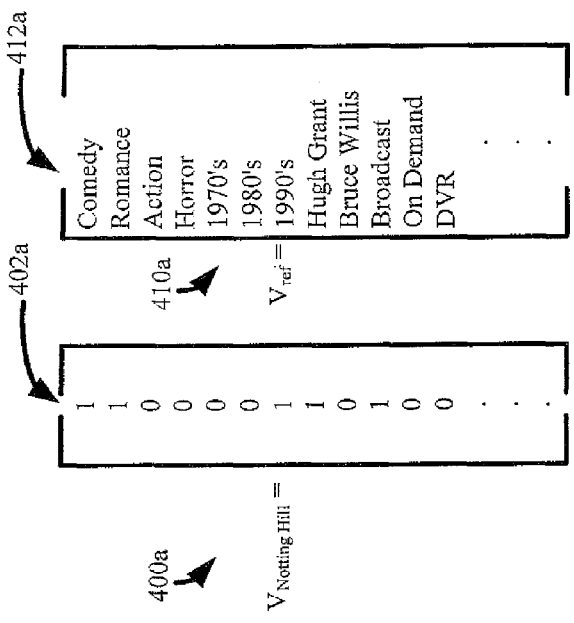
FIG. 4c
FIG. 4e
$V_{\text{Notting Hill}} = (\text{Comedy, Romance, 1990's, Hugh Grant, Broadcast, ...})$
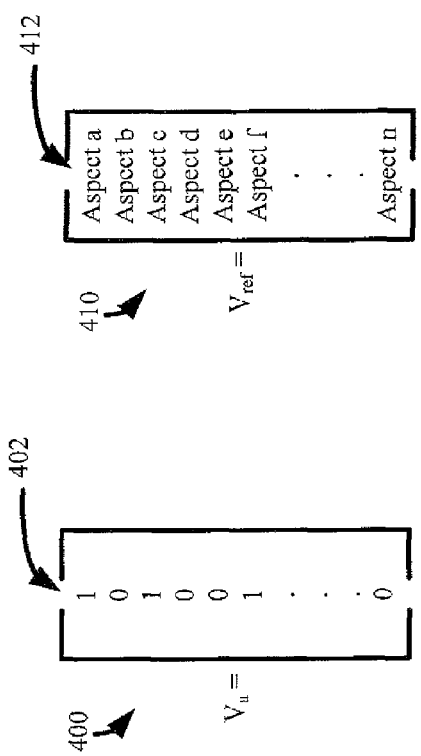
FIG. 4b
FIG. 4a
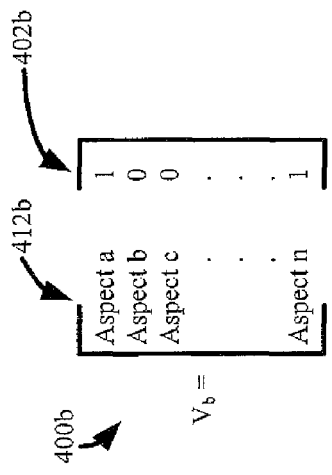
FIG. 4d

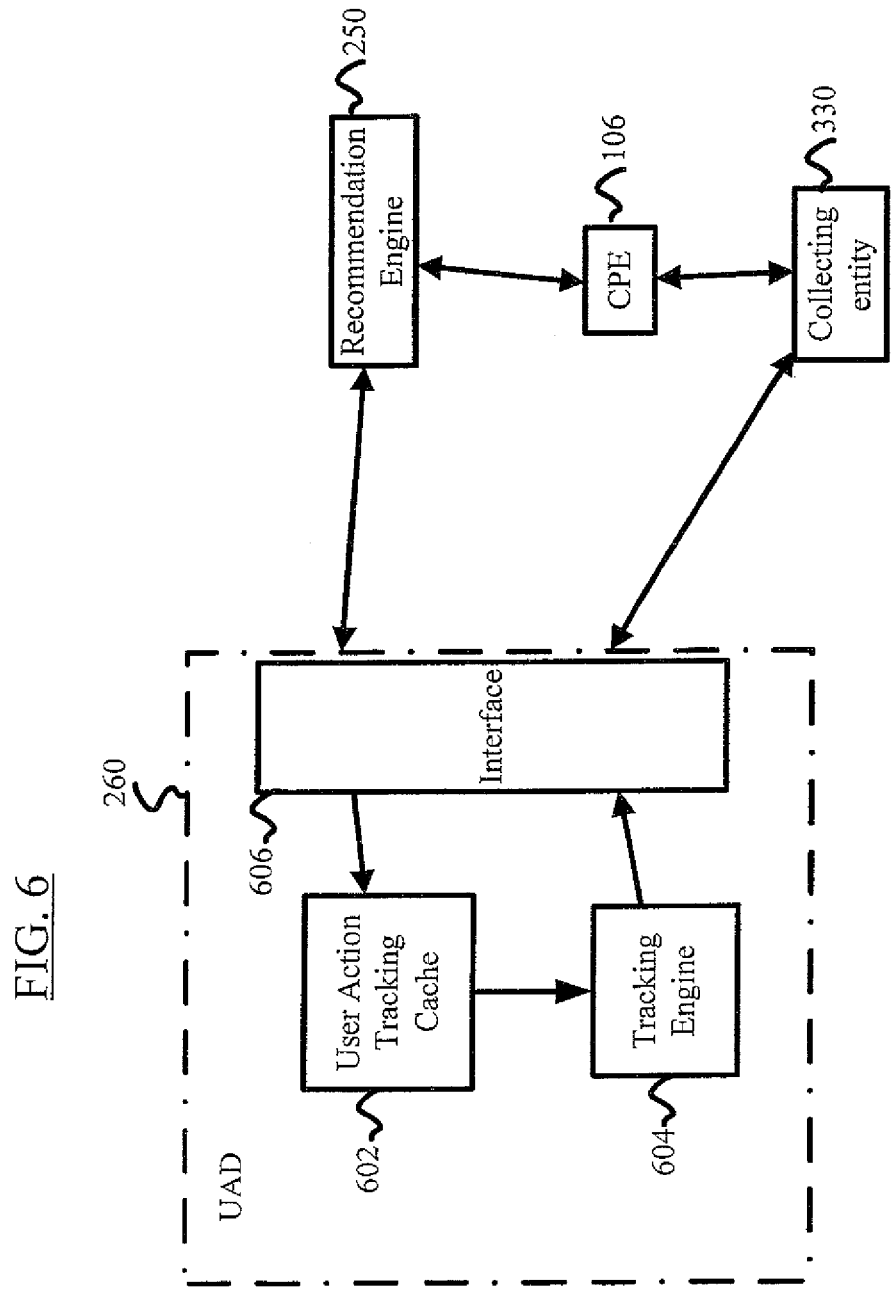

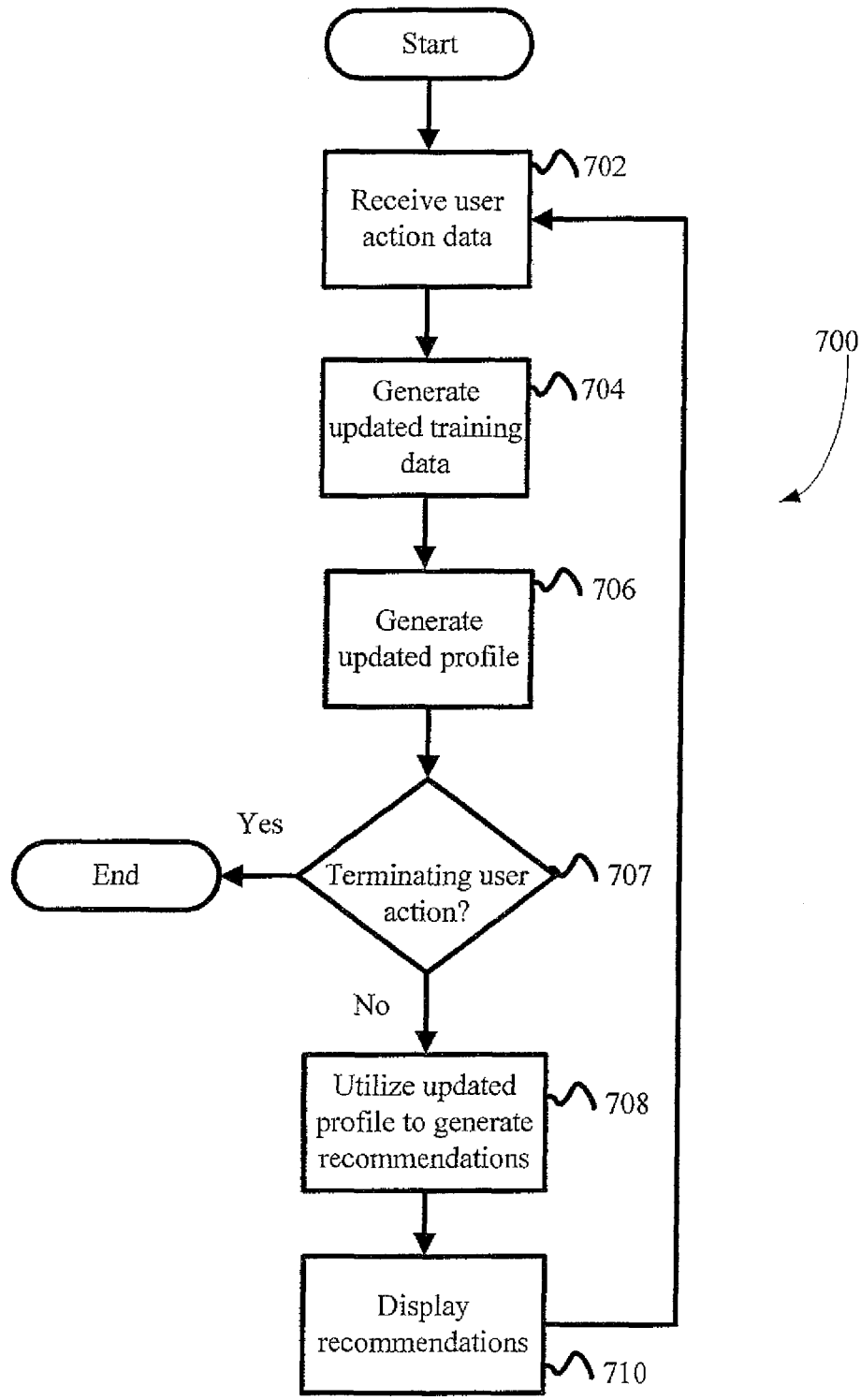

| 1 | Janet Jones | 1.0 |
|---|---|---|
| 2 | Mike Meyers | 1.5 |
| 3 | Michael J. Fox | 3.1 |
| 4 | Tilda Swinton | 6.2 |
| 5 | Cate Blanchett | 0.3 |
| 6 | Kate Winslet | 1.1 |
| 7 | Michelle Pfeiffer | 1.0 |
| 8 | Hugh Grant | 4.2 |
| 9 | William Holden | 5.5 |
| 10 | | |

B

902     904     900

| 1 | Janet Jones | 1.0 |
|---|---|---|
| 2 | Mike Meyers | 1.5 |
| 3 | Michael J. Fox | 3.1 |
| 4 | Tilda Swinton | 6.2 |
| 5 | Cate Blanchett | 0.3 |
| 6 | Kate Winslet | 1.1 |
| 7 | Michelle Pfeiffer | 3.0 — 904b |
| 8 | Hugh Grant | 4.2 |
| 9 | William Holden | 5.5 |
| 10 | George Clooney | 2.0 — 904a |

C

902     904     900

| 1 | Mike Meyers | 1.5 |
|---|---|---|
| 2 | Michael J. Fox | 3.1 |
| 3 | Tilda Swinton | 6.2 |
| 4 | Cate Blanchett | 0.3 |
| 5 | Kate Winslet | 1.1 |
| 6 | Michelle Pfeiffer | 3.0 |
| 7 | Hugh Grant | 4.2 |
| 8 | William Holden | 5.5 |
| 9 | George Clooney | 2.0 |
| 10 | Carey Grant | 2.0 — 904c |

RECOMMENDATION ENGINE APPARATUS AND METHODS

RELATED APPLICATIONS

This application is related to co-owned and co-pending U.S. patent application Ser. No. 12/414,554, filed contemporaneously herewith on Mar. 30, 2009 and entitled "Personal Media Channel Apparatus and Methods", which is incorporated herein by reference in its entirety.

BACKGROUND OF THE INVENTION

1. Field of the Invention

The invention relates to the field of content delivery over a network. Specifically, in one exemplary aspect, the invention relates to methods and apparatus for selecting content from a variety of sources in a cable television or satellite network to a client device.

2. Description of Related Technology

Recent advances in content delivery technologies have led to the proliferation of different content sources carrying a wide variety of content. A viewer may be easily overwhelmed by the presentation of hundreds of broadcast channels, purchasable content channels (e.g., VOD, pay-per-view, etc.) and the like, offering programming 24 hours per day. A channel-by-channel search for specific content can be tedious and frustrating to the user. With such an abundance of content offered, the user may be unable to rapidly and easily locate content of interest at any one time.

Likewise, other technological advancements have brought into common use electronic devices that allow users to record content received from a bearer network (such as a cable television or satellite network), whether at their premises or another location within the network. These devices include, inter alia, on digital video recorders (DVR), and personal video recorders (PVR). Access to content stored on recording devices further increases the overabundance of content available to the user.

Some existing methods for specifically providing content in which a user may be interested, from among the large quantity and variety of content available, include the utilization of demographic data and/or explicit viewer designation of particular content. For instance, a user may have his/her content pre-selected (or at least the possibilities narrowed) based on their demographics, and/or explicit selections or preferences of the user. However, these methods generate targeted content based only on the information a user specifically gives or enters into the system (or which can be gleaned from their subscriber account, etc.).

Various other solutions have been presented to assist a user in finding content of interest including, for example, the utilization of computer programs adapted to generate "playlists" of recommended content. These programs rely on various filtering algorithms known in the prior art.

Filtering algorithms may generally be distinguished as being of one of two types; (i) those using collaborative filtering, and (ii) those which use content-based filtering. Collaborative filtering collects user data in the form of e.g., user-supplied ratings of individual pieces of content in a given domain. The similarities and differences of several user profiles are then examined to make a recommendation or decision for a piece of content. Collaborative filtering requires a community-based database. Alternatively, content-based filtering identifies items based on some correlation between characteristics in a piece of content and a user's preferences (or user's profile). However, the majority of these systems rely heavily on user-supplied criteria ("seed" items), and/or are static in nature (i.e., do not change unless the user changes the input criteria). Hybrid content-based and collaborative filtering systems have also been developed.

Alternative methods adapted to generate playlists of recommended content update themselves based upon a user's explicit feedback and/or a user's implicit actions. However, these methods cause the playlists generated to quickly become too narrowed and specific, and do not account for changes in a user's preferences over short periods of time, such as, within different parts of a day. Other prior art content-based systems recommend content based on a user profile, which is entered substantially by the user.

Various other solutions have also been presented to assist a user in finding content of interest including, for example, the utilization of a searchable program guide such as that described in U.S. Pat. No. 7,228,556 to Beach, et al., issued Jun. 5, 2007 and entitled "Distributed, Interactive Television Program Guide; System and Method"

Customizable program guides are also used in the prior art to provide targeted content to a user. These generally fit into two distinct categories: (i) those in which a user must enter preference data, and (ii) those that are able to gather data about a user without user specification. The first category of customizable program guides, as stated, inconveniently require a user to manually enter preference or other data. One example of the first category of customizable program guides is described in U.S. Pat. No. 7,185,355 to Ellis, et al., issued Feb. 27, 2007 and entitled "Program Guide System with Preference Profiles". Exemplary prior art of the second category of customizable program guides includes U.S. Pat. No. 7,020,652 to Matz, et al., issued Mar. 28, 2006 and entitled "System and Method for Customizing Content-Access Lists".

Based on the foregoing, there is a need for improved apparatus and methods for recommending or providing content that a particular user (or group of users) is most likely to have an interest in or find enjoyable, without undue burden on the user in terms of required inputs or feedback. Such apparatus and methods would not rely substantially on user-supplied criteria or ratings, and would also be adapted to dynamically and rapidly update to reflect a user's preferences with a high level of proficiency; the ability to update including the utilization of explicit and implicit data.

Such apparatus and methods would also generate profiles that would not become too narrowed over time, but rather would respond to a user's changing preferences including preference changes over short periods of time (such as during different parts of a day).

Additionally, the abovementioned apparatus and methods would provide a user with the ability to choose among recommended content, and present a user with a navigable list of content prioritized according to a system which immediately takes into account the users activities and thereby derives an even more finely tuned profile without becoming overly narrow and accounting for changes in a user's preferences over short periods of time, such as, within different parts of a day.

These features would also be provided using substantially extant network infrastructure and components, and would be compatible with a number of different client device and delivery systems including both wired and wireless technologies.

SUMMARY OF THE INVENTION

The present invention satisfies the foregoing needs by providing improved apparatus and methods for the targeted delivery of content over a network.

In a first aspect of the invention, a recommendation apparatus is disclosed. In one embodiment, the apparatus comprises: a storage device, the storage device adapted to: store a plurality of information regarding a plurality of content; and store a plurality of user profiles; and a digital processor in data communication with the storage device and adapted to run a computer program thereon, the computer program adapted to: compare the information regarding a plurality of content to individual ones of the plurality of user profiles; and based at least in part on the comparison, produce at least one list of content, the content bearing a relationship to at least one of the plurality of user profiles; and an interface in data communication with the network and the processor.

In one variant, the apparatus comprises a headend entity or hub of the network.

In a further variant, the apparatus comprises a consumer premises device.

In another variant, the plurality of information regarding the plurality of content and the plurality of user profiles are respectively expressed as first vectors and second vectors having identical numbers of columns and rows as one another, the first vectors and second vectors comprising one or more aspects corresponding to metadata associated with individual ones of the plurality of content. The plurality of information regarding the plurality of content and the plurality of user profiles are expressed as e.g., n×1 column vectors and the storage device is further adapted to store a n×1 column reference vector defining aspects expressed in the vectors, or alternatively as n×2 column vectors or 1×n row vectors.

In a further variant, the act of comparing the plurality of content to the plurality of user profiles comprises: generating a content record for individual ones of the plurality of content, the content records comprising a vector containing metadata regarding the content; and calculating a dot product of individual ones of the first vectors and individual ones of the second vectors to produce a scalar quantity. The act of producing at least one list of content comprises creating a list of content having a scalar quantity greater than or equal to a pre-set real-value number, and providing the list to a client device associated with the at least one user profile.

In still another variant, the list comprises information for identification and retrieval of each of the content in the list.

In another variant, at least one of the plurality of user profiles comprises a template user profile.

In yet another variant, the computer program is further adapted to update the at least one user profile by adding a training vector to individual ones of the second vectors, the training vector comprising weighted data regarding one or more user actions.

In a second aspect of the invention, computer readable apparatus is disclosed. In one embodiment, the apparatus comprises media adapted to contain a computer program having a plurality of instructions, the plurality of instructions which, when executed: examine metadata associated with a plurality of content; generate a content record for each of the plurality of content examined based at least in part on the metadata; compare individual ones of the content records to individual ones of a plurality of user profiles associated with individual ones of a plurality of client devices; compile at least one list, the list comprising information regarding individual ones of the plurality of content having a threshold similarity to at least one of the plurality of user profiles, and information for identification and retrieval of each of the content in the list; and transmit the list for display by at least one of the plurality of client devices.

In one variant, the metadata comprises information regarding at least one of genre, content type, advisory rating, language, era, or actor.

In another variant, the content records and the plurality of user profiles are expressed as vectors having identical numbers of columns and rows as one another, the vectors comprising one or more aspects corresponding to metadata associated with individual ones of the plurality of content. The act of comparing the content records to the plurality of user profiles comprises calculating a dot product of the content record vectors and the user profile vectors to produce a scalar quantity, and the act of compiling at least one list of content having a threshold similarity to at least one of the plurality of user profiles comprises creating a list of content having a scalar quantity with respect to the user profile greater than or equal to a predetermined real-value number.

In a further variant, the computer program is further adapted to update at least one of the plurality of user profiles according to user actions occurring on a client device to which the at least one user profile is associated by adding a training vector to the user profile vector, the training vector comprising content records weighted according to user actions associated therewith.

In another embodiment, the computer readable apparatus comprising media adapted to contain a computer program having a plurality of instructions, the plurality of instructions which, when executed: maintain at least one user profile; generate a plurality of content records at least in part by utilizing metadata relating to a plurality of content; provide access to the plurality of content to a user; store a record of at least one act taken by the user with respect to an individual one of the plurality of content; utilize the record of at least one act taken by the user, at least in part, to generate an updated user profile; and compare the updated user profile to individual ones of the content records of the plurality of content to identify individual ones of the plurality of content having an prescribed level of relatedness to the user profile.

In one variant thereof, the user profile comprises a pre-set or template user profile.

In another variant, the plurality of content records and the user profile are expressed as vectors having identical numbers of columns and rows as one another. The act of comparing the updated user profile to individual ones of the content records comprises calculating a dot product of individual ones of the content records to the user profile to produce a scalar quantity, and the act of identifying individual ones of the plurality of content having a prescribed level of relatedness to the user profile comprises identifying individual ones of the plurality of content having a scalar quantity equal to or greater than a predetermined value.

In a further variant, the apparatus is adapted to: generate a weighted content record of the content acted upon by multiplying the content record associated with the at least one act by a weighting factor determined by the nature of the act and an estimated relation of the act to the user's preferences; and add the weighted content record to the user profile to generate the updated user profile.

In still another variant, the act of identifying individual ones of the plurality of content having an predetermined level of relatedness to the user profile comprises examining attributes of individual ones of the plurality of content for comparison to equivalent attributes of the user profile.

In a third aspect of the invention, a method of recommending content is disclosed. In one embodiment, the content is targeted to a particular user in a content based network, and the method comprises: generating a plurality of content records regarding a plurality of content; comparing individual ones of the plurality of content records to at least one user profile; storing information regarding individual ones of the plurality of content records which bear a substantial relation to the user profile; and displaying the information regarding the individual ones of the plurality of content records.

In one variant, the act of generating the plurality of content records comprises utilizing metadata associated with the plurality of content, and wherein the content records and the user profile are expressed as vectors having identical numbers of columns and rows as one another, and the act of comparing individual ones of the plurality of content records to the at least one user profile comprises calculating a dot product of individual ones of the content records to the user profile to produce a scalar quantity. Displaying the information comprises displaying the information in a list which is arranged based at least in part by the scalar quantity.

In another variant, the method her comprises providing content associated with at least one of the individual ones of the plurality of content records which bear a substantial relation to the user profile.

In a further variant, determination of the content records bearing substantial relation to the user profile comprises examining various aspects of the content records against corresponding aspects of the user profile.

In a fourth aspect of the invention, a user action tracking apparatus is disclosed. In one embodiment, the user action tracking apparatus is adapted for data communication with at least a computer program adapted to recommend content to a user, and comprises: an interface for receiving user action data from a content-based network; a storage apparatus adapted to store a plurality of records regarding user actions, each record relating at least one action of a user to an individual content element; and a digital processor adapted to run a computer program thereon, the computer program adapted to: generate the plurality of records regarding user actions from the user action data; utilize the plurality of records to generate a first training record; and update the first training record for subsequent ones of the user action data received.

In one variant, the storage apparatus comprises a cache memory.

In another variant, the records regarding user actions comprise at least: (i) identifying information regarding content to which the user action relates, (ii) a chronological reference, and (iii) a description or descriptor of the user action.

In a further variant, the act of generating the first training record comprises: generating a content record for each of the individual content to which the individual user actions relate, the content record comprising a vector having an identical number of columns and rows as a user profile associated with the user action; associating the description of the user action associated with the individual content in the record regarding user actions with a weighting factor; and multiplying the content record vector by the weighting factor.

In another variant, the act of updating the first training record comprises: associating the description of the user action associated with the individual content in the record regarding user actions with a weighting factor; and multiplying the first training record by the weighting factor to arrive at an updated training record.

In still another variant, the apparatus is further adapted to distribute the updated training record to the computer program adapted to recommend content to a user for use thereby.

In another variant, the apparatus is further adapted to: receive at least one user profile, the user profile represented as a vector; and utilize the updated training record to update the user profile by adding the training record to the profile. The user profile and the training record comprise vectors having an identical number of rows and columns as one another.

In a fifth aspect of the invention, a method of identifying content precisely targeted to a user based on one or more actions of the user is disclosed. In one embodiment, the method comprises: maintaining a user profile expressed using a vector; generating a plurality of content records based, at least in part, on metadata regarding a plurality of content, the content records expressed as vectors, wherein the user profile vector and the content records vectors have identical numbers of columns and rows as the other; providing access to the plurality of content to the user; storing a record of at least one action taken by the user with respect to an individual one of the plurality of content; generating a weighted content record of the content acted upon by the user; utilizing the weighted content record at least in part to generate an updated user profile; calculating a dot product of individual ones of the content records to the user profile to produce a scalar quantity; and identifying individual ones of the plurality of content having a prescribed relation to the updated user profile based at least in part on the scalar quantity.

In one variant, the user profile comprises a pre-set or template user profile.

In another variant the plurality of content records and the user profile are expressed as n×1 column vectors; and the method further comprises storing a n×1 column reference vector defining aspects expressed in the vectors.

In a further variant, the act of generating the weighted content record comprises multiplying the content record associated with the at least one act by a weighting factor.

In another variant, the act of identifying individual ones of the plurality of content having a prescribed relation to the user profile based at least in part on the scalar quantity comprises identifying individual ones of the plurality of content having a scalar quantity equal to or greater than a predetermined value.

In yet another variant, the method further comprises displaying identifying information regarding the identified individual ones of the plurality of content having a prescribed relation to the user profile.

In a sixth aspect of the disclosure, a computer readable apparatus is disclosed. In one embodiment, the computer readable apparatus comprises media adapted to implement a computer program having a plurality of instructions thereon, which, when executed: (i) maintain at least one user profile; (ii) generate a plurality of content records via at least metadata relating to a respective plurality of content; (iii) provide access to the plurality of content to a user; (iv) store a record of at least one act taken by the user with respect to an individual one of the plurality of content; (v) multiply an individual one of the plurality of content records associated with the individual one of the plurality of content by a weighting factor determined by a nature of the act and an estimated relation of the act to one or more user preferences to generate a second content record; and (vi) add the second content record to the user profile to generate a second user profile.

Other features and advantages of the present invention will be immediately recognized by persons of ordinary skill in the art with reference to the attached drawings and detailed description of exemplary embodiments as given below.

BRIEF DESCRIPTION OF THE DRAWINGS

FIG. 2 is a logical flow diagram illustrating one embodiment of the method of targeted content recommendation and updating recommendations subsequent to user activity according to the invention.

FIG. 4a is a graphical representation of an exemplary content record, represented as a 1×n column vector, for use in the recommendation engine of the present invention.

FIG. 4b is a graphical representation of an exemplary reference record, represented as a 1×n column vector, for use in the recommendation engine of the present invention.

FIG. 4c is a graphical representation of an exemplary content record and associated reference record, represented as 1×n column vectors, for use in the recommendation engine of the present invention.

FIG. 4d is a graphical representation of an exemplary content record, represented as a 2×n column vector, for use in the recommendation engine of the present invention.

FIG. 4e is a graphical representation of an exemplary content record, represented as an n×1 row vector, for use in the recommendation engine of the present invention.

FIG. 6 is a block diagram illustrating an exemplary user action database configuration in accordance with one embodiment of the invention.

FIG. 7 is a logical flow diagram illustrating one embodiment of the method of utilizing user actions to update a user profile and provide targeted recommendations according to the invention.

FIG. 9 is a simplified graphical illustration of three exemplary dynamic training lists in accordance with one embodiment of the invention.

DETAILED DESCRIPTION OF THE INVENTION

Figure 1:
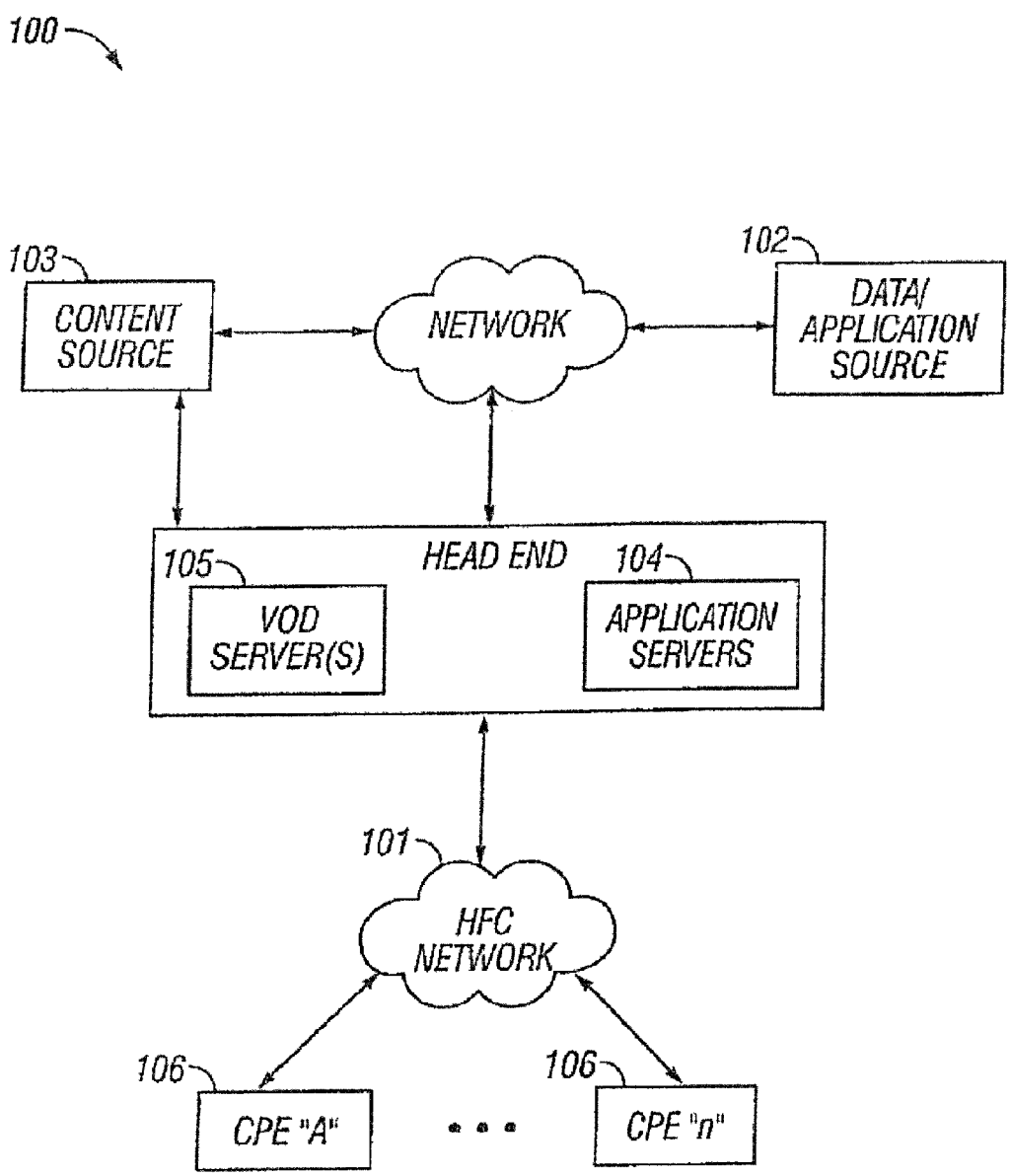
FIG. 1 is a functional block diagram illustrating an exemplary HFC cable network configuration useful with the present invention.

Reference is now made to the drawings wherein like numerals refer to like parts throughout.

As used herein, the term "advertisement" and similar forms refers without limitation to any audio, visual, or promotion, message, or communication, whether for-profit or otherwise, that is perceptible by a human. Examples of advertisements include so-called "bumper" advertisements (advertisements inserted before or after a client requested program), "pause" advertisements (presented when a client sends a pause control command to a video server or the like), or additional and replacement advertisements.

As used herein, the term "application" refers generally to a unit of executable software that implements a certain functionality or theme. The themes of applications vary broadly across any number of disciplines and functions (such as on demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video code, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

As used herein, the term "consideration" refers without limitation to a payment, incentive, option, forbearance of a debt, credit, or any other thing or act which conveys monetary or any other type of value between two or more parties, such as for example cash or credit/debit payments, credits to account, erasure of debt, exchanges, barters, options or rights of first refusal.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" or "multi-systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "on demand" or "OD" is meant to include any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, headend event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video on demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the terms "storage device" and "storage media" refer to without limitation computer hard drives, DVR device, memory, RAID devices or arrays, optical media (e.g., CD-ROMs, Laserdiscs, Blu-Ray, etc.), or any other devices or media capable of storing data, content or other information.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the invention discloses methods and apparatus for the identification and recommendation of content targeted to a particular user (or group of users) within a content-based network, such as a cable television or satellite network. The present invention provides a mechanism for particularly selecting content to align with a user's preferences (the latter which the viewer need not enter manually). The content provided to the user is compiled from various distinct sources, including, inter alia, DVR, broadcasts, VOD systems, start over systems, etc. The present invention provides a mechanism to learn (and unlearn) the user's preferences and which content they are likely to enjoy based on actions taken with regard to the content. The recommended content may be displayed in one embodiment as a list or table of titles (and related information of interest), or alternatively fed to the user as a continuous content stream on a virtual channel. In another embodiment, the compiled content is presented to the user in conjunction with an electronic program guide (EPG) which may be personalized to that user if desired.

In another aspect, client applications are utilized to compile the playlist based on user-imputed as well as pre-programmed user profiles. In another embodiment, various feedback mechanisms are utilized to enable the client application to "learn" from the user's activities in order to update the user profile, and generate more finely tuned recommendations.

In another embodiment, a user may establish a connection to the aforementioned client applications via the Internet. Accordingly, the user may modify and create a future playlist, and remotely establish programs to record and/or be erased from their premises recording device (DVR, etc.). The dynamics of the recommendation engine generating the user's playlist can also optionally be modified by the MSO, or even the user (to the degree allowed by the MSO).

Methods and apparatus for dynamic secondary content insertion (e.g., recommendation and/or insertion of secondary content such as advertisements, promotions, FVOD content, etc. based upon the user profile) are also described.

In yet another aspect, the client applications discussed above are implemented by a network-based entity such as a hub or headend server adapted to perform the above-described functions for a variety of user profiles (e.g., individual user profiles, or user accounts) simultaneously.

Advantageously, the methods and apparatus of the invention are readily implemented using existing infrastructure (i.e., primarily with software upgrades), thereby obviating significant modifications or expense in implementing such capabilities.

An operational and business rules "engine" useful in implementing various operational or business goals, and methods of doing business, are also disclosed.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multi-system operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over a satellite or millimeter wave-based network.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

Moreover, while the primary embodiments described herein describe predominantly the distribution of programs or similar content, other types of content including without limitation advertisements/promotions, instructional videos, or even data applications or files may likewise be distributed using the techniques of the present invention.

It is also noted that while aspects of the invention are described primarily in the context of 6 MHz RF channels within the HFC network, the present invention is applicable to any frequency/bandwidth, such as for example 8 MHz channels. Further, while generally described in terms of content delivery over discrete QAMs or RF channels, relevant portions of the invention can be used in conjunction with multiplexing algorithm and wideband tuner apparatus such as that described in co-owned and co-pending U.S. patent application Ser. No. 11/013,671 filed Dec. 15, 2004 and entitled "Method And Apparatus For Wideband Distribution Of Content", incorporated herein by reference in its entirety.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that include multicast transmission of data delivered over a network having virtual or logical channels, the present invention is applicable to other types of services that may include, for example, multicast and unicast data over physical or actual channels.

Network Architecture—

FIG. 1 illustrates a typical generalized content-based network configuration with which the recommendation engine apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

Furthermore, as discussed in greater detail subsequently herein, the generalized network of FIG. 1 also includes one or more interfaces to other (e.g., external) networks that can be used for the "personalized" delivery of content.

The data/application origination point 102 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the servers 104, 105) that can be accessed by a distribution server 104 or VOD server 105. Exemplary embodiments of a "converged" CPE (i.e., CD) of the invention are also described subsequently herein.

Figure 1A:
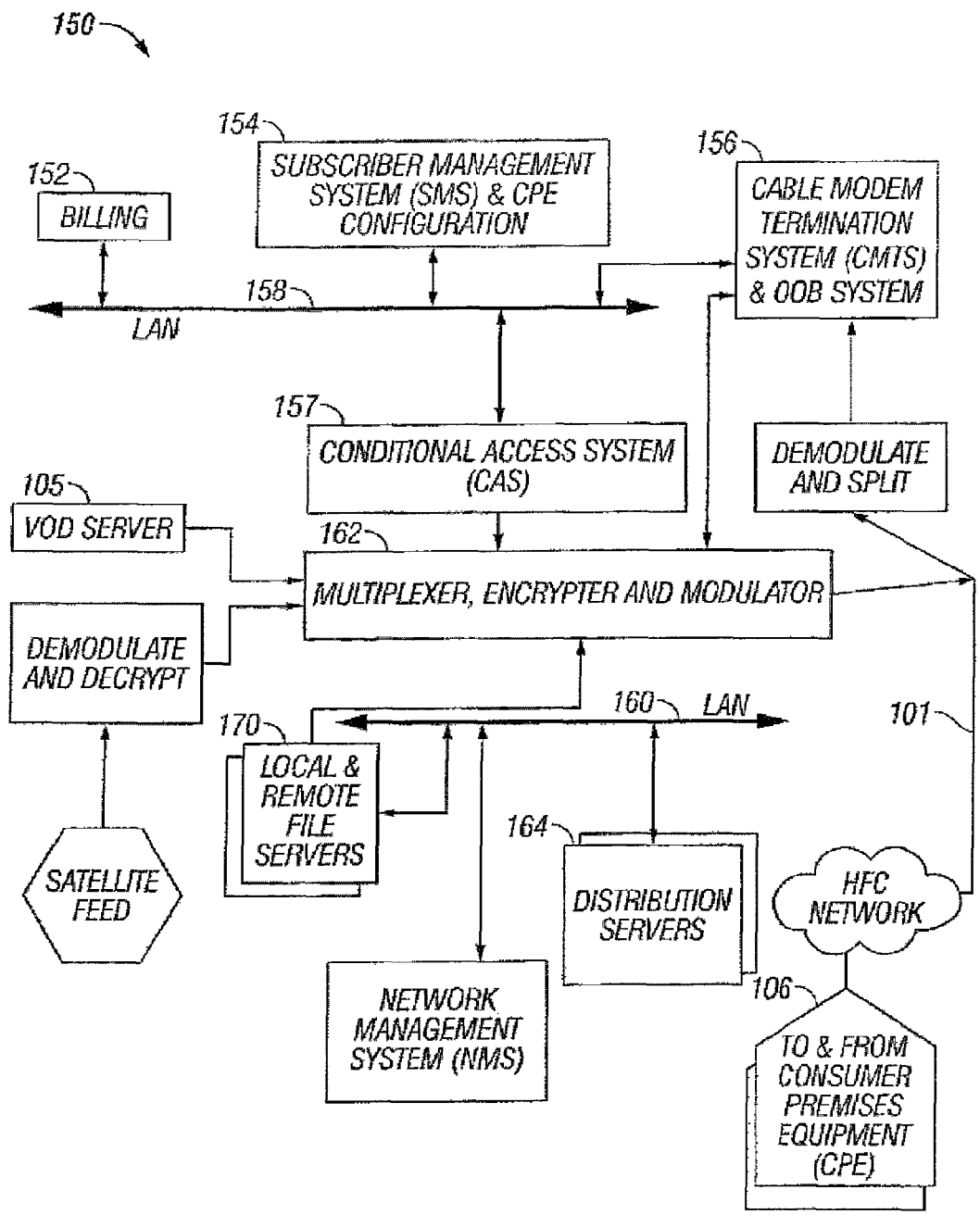
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1*b*) via a variety of interposed network components.

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1*c* provided subsequently herein). As yet another alternative, a multi-location or multi-stage approach can be used, such as that described in U.S. patent application Ser. No. 11/048,334, entitled "Apparatus and Methods for Multi-Stage Multiplexing in a Network" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed-forward" mechanisms for transferring information between multiplexing stages.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
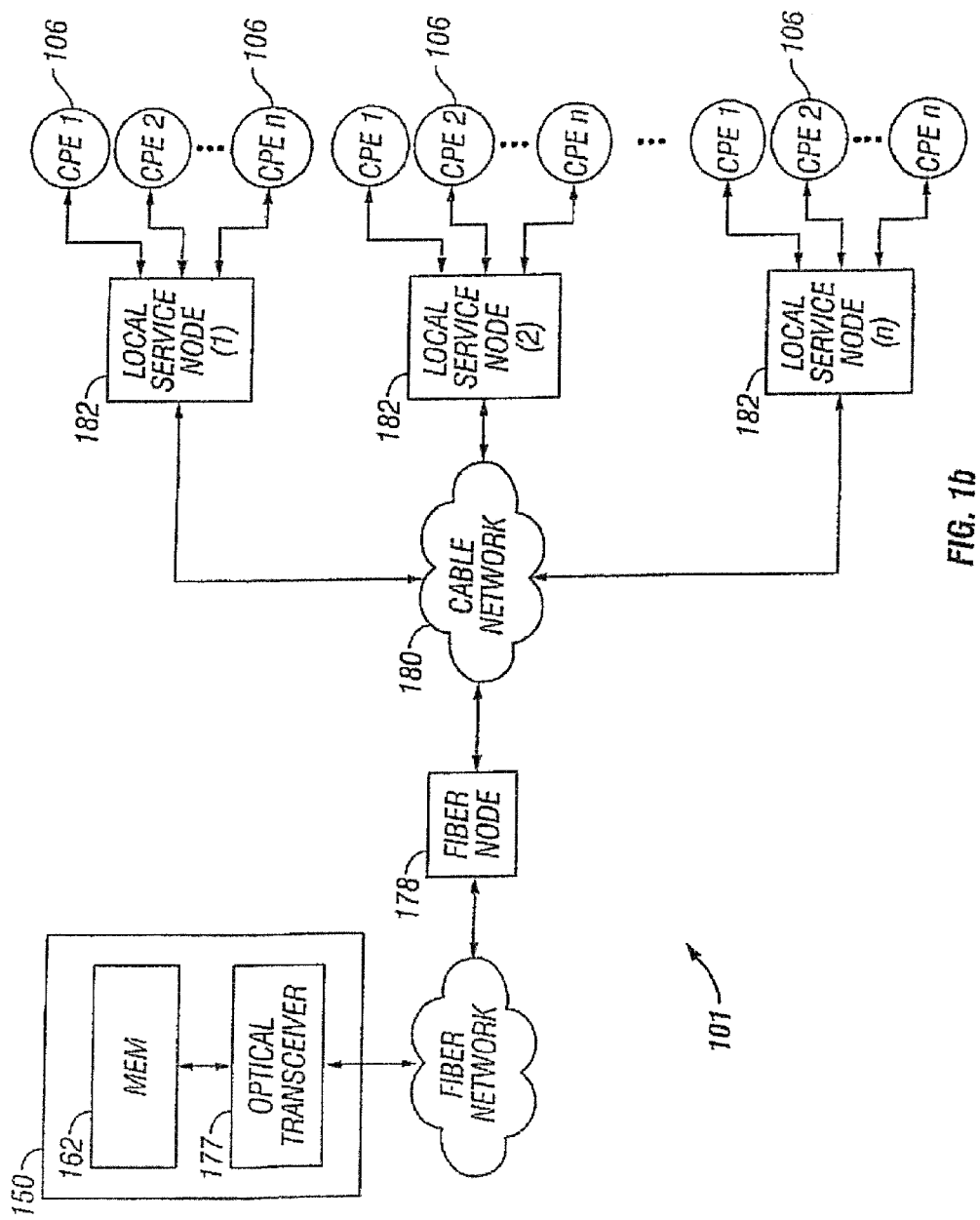
FIG. 1b is a functional block diagram illustrating one exemplary local service node configuration useful with the present invention.
Figure 1C:
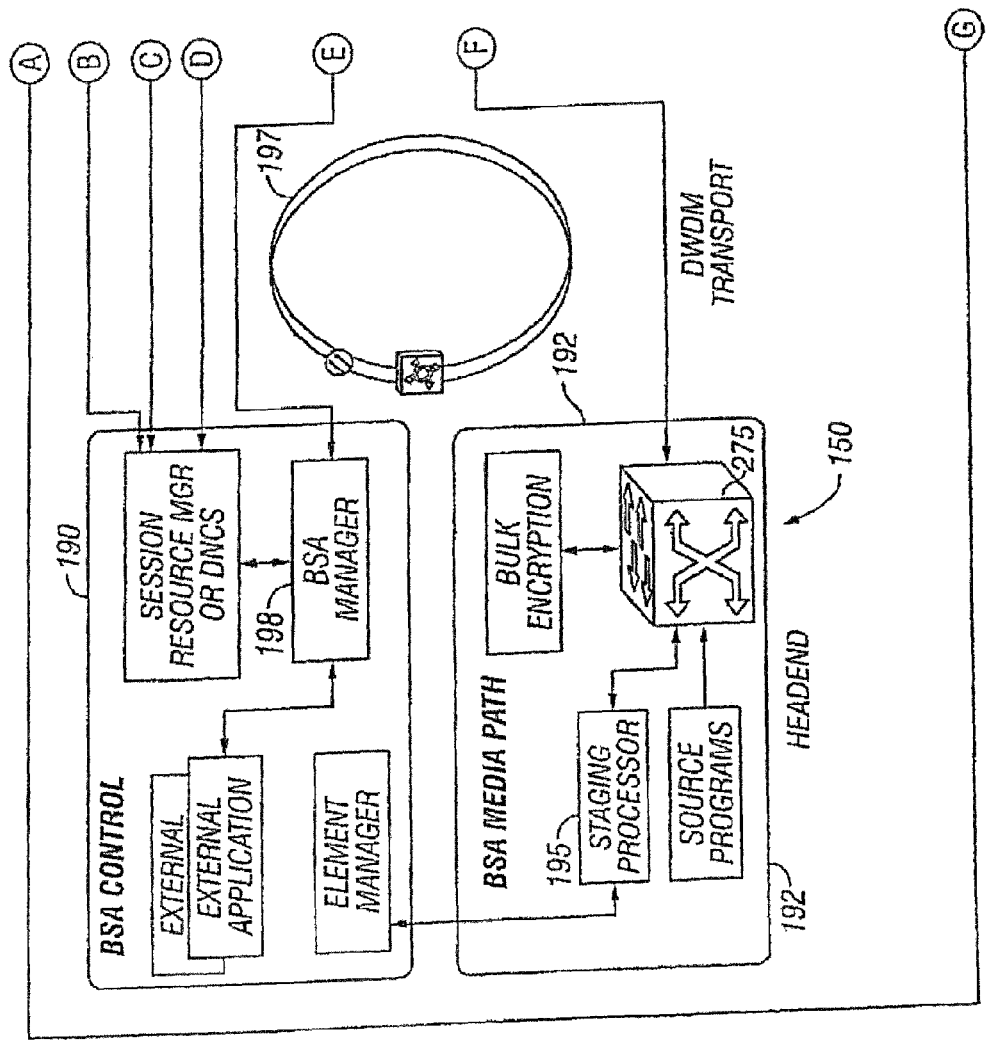
FIG. 1c is a functional block diagram illustrating one exemplary broadcast switched architecture (BSA) network useful with the present invention.
Figure 1C:
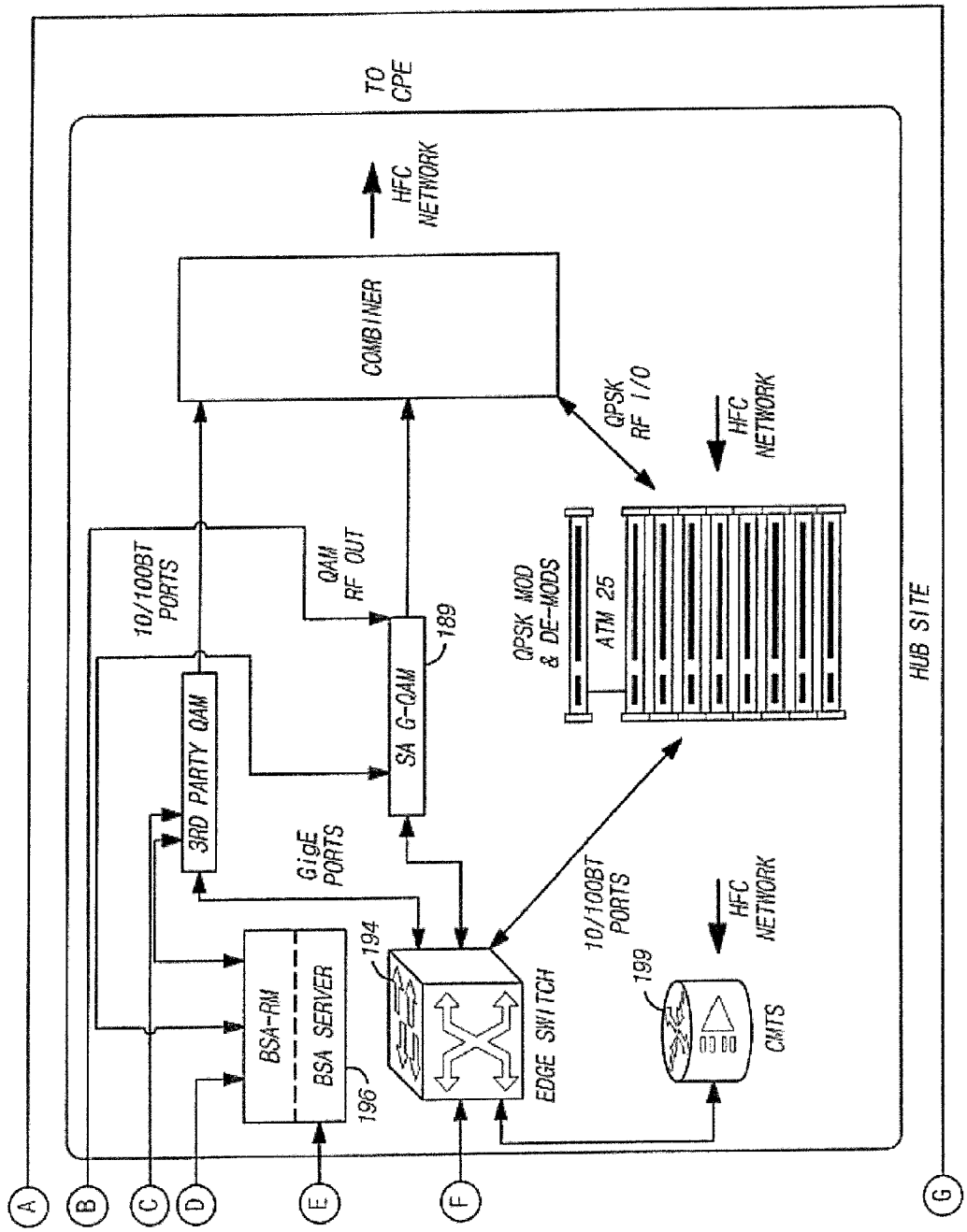

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the headend or further downstream). The optical domain signals are then distributed to a fiber node 178, which farther distributes the signals over a distribution network 180 to a plurality of local servicing nodes 182. This provides an effective 1:N expansion of the network at the local service end.

"Switched" Networks—

FIG. 1*c* illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also typically disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1*a*-1*e* can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

As will be discussed in greater detail below, the exemplary embodiment of the recommendation engine of the present invention comprises one or more software applications operative to run on a digital processor within a headend entity (such as the below described recommendation server), a hub entity (such as the below described BSA server), and/or a user CPE 106 (or other user device).

Methodology—

Exemplary embodiments of the methodology associated with use of the recommendation engine of the invention are now described in detail with respect to FIG. 2.

In the illustrated embodiment, the recommendation engine 250 receives metadata regarding each one of a plurality of content elements that are available to the network, and translates the metadata to a content record describing the content to which it relates. Generally speaking, "metadata" comprises extra data not typically found in typical primary content (or at least not visible to the users of the network), such as that rendered in an XML or other such format. For each component of primary content (e.g., video/audio) or other content available from the sources, one or more metadata files are associated that specify the relevant search terms or primitives for that content. This metadata can be provided with the content from its source or provider (e.g., a network studio or station or the like), or alternatively added by the MSO. Alternatively, portions of the metadata can be added by multiple entities, and/or editing of another entity's metadata performed. Various permutations and mechanisms for generating, adding and editing metadata will be recognized by those of ordinary skill, and hence are not described in greater detail herein.

The content available to the engine (and users of the network) may comprise content from various sources including, inter alia, broadcast content, VOD content, nPVR content, DVR content (e.g., that stored on the user's premises recording device), etc. Depending on the configuration of the user's CPE, other content such as IPTV content may be provided as well.

The recommendation engine 250 also receives information regarding the activities of individual users (or multiple users within a given premises) compiled into one or more user profiles. As will be discussed below, several user profiles may also relate to one CPE 106, or user. The user profiles are, in the illustrated embodiment, updated at every instance of a user action, although it will be recognized that other models may be used (such as where only certain classes of user actions, or those occurring during certain periods of time or dates, are recorded and used for update). The recommendation engine compares the content records to individual ones of the user profile (or alternatively to a composite user profile representing one or more users or CPE). Content which exhibits a threshold level of similarity to the user profile (determined in one embodiment by pre-set threshold values) is collected and presented to the user, such as in the form of e.g., a playlist ranked in priority order. Thus, the recommendation engine 250 utilizes the user profile to generate recommendations of content stemming from various sources which is of likely interest to a particular viewer (or group of users).

FIG. 2 illustrates one embodiment of the method 200 by which individual ones of a plurality of content are recommended to a user. According to the exemplary method 200, the recommendation engine 250 receives content metadata, and utilizes the metadata to generate content records (step 202). Exemplary methods for the generation of content records will be discussed below. In the present context, the content records generally are descriptive of or reflect the status of the content with respect to the particular aspects considered.

Per step 204, the recommendation engine 250 then compares various aspects of the metadata of an individual piece of content (via its content record or records) to a selected user profile. If the recommendation engine 250 determines (at step 206) that the content is not an adequate match, such as based on criteria established by the number and weight of matches within the various aspects of the content examined and a score generated thereby, then the content will be discarded per step 208.

However, if an adequate match is found then, per step 210, the content record will be stored. The PID, access code, and/or other means for the recommendation engine 250 to locate and access the content are also stored. Next, at step 212, the recommendation engine 250 determines whether there are any pieces of content which have not yet been analyzed (step 212). If there are, the recommendation engine 250 will begin again at step 204 with respect to the remaining content.

If and/or when there is no longer any content to examine, the recommendation engine 250 will, at step 214, send the stored content to a device which displays the content to a user. The stored content may be displayed to the user in the form of a recommendations or suggestions list giving an appropriate textual and/or graphical representation of the content to a user via a user interface. In another embodiment, stored content is displayed as a substantially seamless stream to a personalized "virtual" television channel, such as that described in previously referenced co-owned, co-pending U.S. patent application Ser. No. 12/414,554, filed contemporaneously herewith on Mar. 30, 2009 and entitled "Personal Media Channel Apparatus and Methods", incorporated herein by reference in its entirety. The user interface on which the stored content is displayed may comprise, inter alia, a CPE 106 (e.g., a DSTB or converged premises device), a mobile client device (such as a cellular telephone, PDA, etc.), a personal computer, etc.

Alternatively, where no more content is available for examination against the user profile, the recommendation engine 250 may at least temporarily cease operation. This will generally occur upon the happening of a user action terminating the necessity for a playlist, recommendation, or suggestion, etc. It will be appreciated, however, that the recommendation engine may run "in the background" as well; i.e., when there is no demand by the user for programming or interaction with the user interface. For instance, at times when the user is no longer watching their television, the recommendation engine can continue to run to update playlists for a number of users with new content or titles received, for new actions taken by the user during their last use, etc., which could not be completed while the user was interactively watching. In this manner, the user's playlist is updated and ready for use when the user returns to viewing.

At step 216, after the display of the content to the user (step 215), the user will take an action at the user interface (UI) of the display device 270 which provides the recommendation engine 250 with user action data (e.g., either positive or negative explicit or implicit data, described in greater detail subsequently herein). In one embodiment, however, a user's failure to take an action may also provide the recommendation engine 250 with feedback data (e.g., by expiration of a timer without user action, or failure of an event to occur).

At step 218, data collected from user actions is sent to a user action database (UAD 260) where the user action data is used to calculate updated training data in the form of an updated training vector, as will be discussed in greater detail below. Then, at step 220, the updated training vector is sent back to the recommendation engine 250 from the UAD 260 or its proxy, and an updated user profile is generated. The updated user profile reflects the actions taken with respect to the content. As will be discussed subsequently herein, data may also be generated from actions taken with respect to other content (i.e., content that was not recommended via the recommendation engine 250), and the data used for updating the user profile as well.

The updated user profile is used at step 204 to be compared to content records previously generated as well as those which will be generated from subsequently received content.

Exemplary System Configurations—

Figure 3:
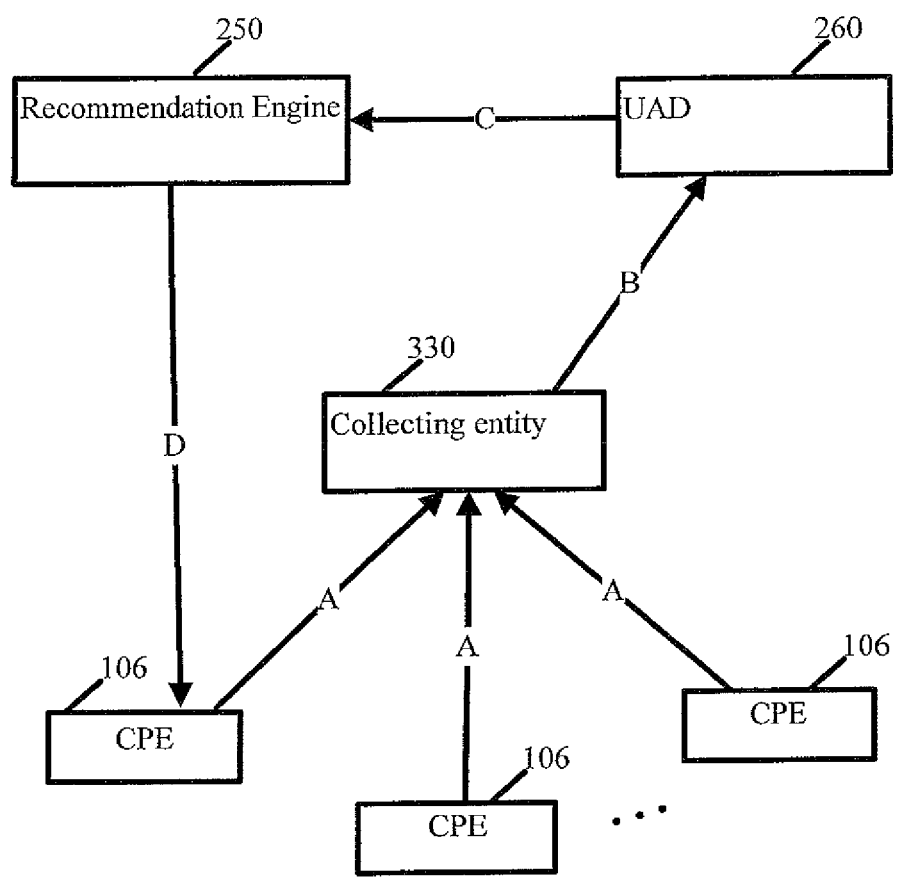
FIG. 3 a functional block diagram illustrating an exemplary network configuration utilizing the recommendation engine of the present invention.

As noted above, the recommendation engine 250 of the present invention may be utilized in inter alia various cable or satellite system configurations; one such system configuration is illustrated in the simplified diagram of FIG. 3.

As illustrated, the CPE 106 (or other user devices) are in data communication with a collecting entity 330. For instance, the collecting entity 330 may comprise a software process running on a server within the network, and the CPE 106 comprise client applications running on the individual CPE 106, such as in a client-server relationship, although other approaches may be used with equal success.

The collecting entity 330 is adapted to gather data from each CPE 106 regarding user actions occurring thereon, via pathway A (which may comprise a physical or logical channel of the type well known in the networking arts). The collecting entity 330 may comprise e.g., a BSA server at a network hub (see FIG. 3a below), one or more VOD servers 105, or a separate headend entity. Alternatively, the CPE 106 may be adapted to collect data regarding user activity rather than a separate entity doing so, and hence the configuration of FIG. 3 is merely exemplary. The collecting entity 330, via pathway B, sends the collected data to a UAD 260.

The UAD 260 uses the user action data to generate training data. In one embodiment, discussed in further detail below, this process comprises generating an updated training vector based on user actions, and sending the training vector to the recommendation engine 250 (via pathway C). The UAD 260 may be located at a headend or hub entity, and/or may be co-located with the aforementioned collection entity 330 or recommendation engine 250.

The recommendation engine 250, as previously discussed, utilizes metadata regarding each one of a plurality of content that is available to the network to generate content records which are individually compared to the one or more user profiles associated with each CPE 106, user (or group of users), or household. Content having a predetermined amount of similarity to a user profile associated with a particular CPE 106 is presented to the CPE 106 via pathway D. Specifically, in one variant, the aforementioned client application running on the CPE 106 receives the recommended content in the form of a message or file, which is then read by the CPE client in order to populate a user interface (e.g., on-screen display) for viewing by the user. It is noted however, that in an alternate embodiment, rather than comprising a separate entity, the various applications of the recommendation engine 250 may be located on a device also having the aforementioned collection entity 330 function, or on a device also having the aforementioned UAD 260 function. In yet another embodiment, the recommendation engine 250 may be present on the CPE 106 (see discussion of FIG. 3b).

Recommendation Server—

In one embodiment (FIG. 3a), one or more recommendation engines 250 are located on a network headend server entity, a recommendation server 302, which comprises a separate entity similar to the VOD servers 105 and application servers 104 co-located at the headend 150 of the network 101. It is also appreciated that, in another embodiment (not shown), the recommendation engine 250 may be present on a non-headend server entity (such as a server located on one or more hubs, third party sites, etc.).

Figure 3A:
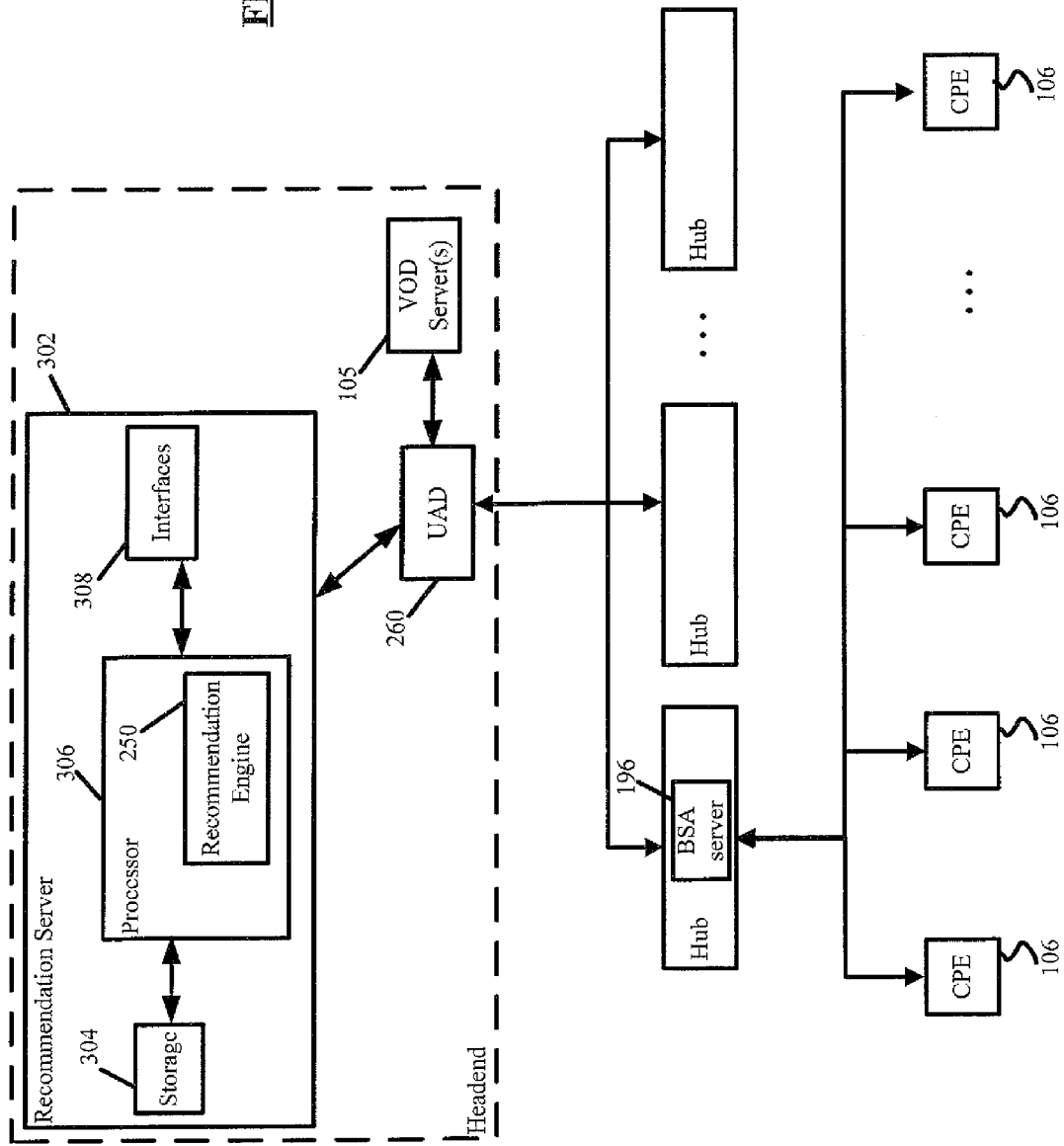
FIG. 3a is a block diagram illustrating one embodiment of a network headend comprising a recommendation engine according to the present invention.

The recommendation server 302 of FIG. 3a comprises storage device(s) 304, a digital processor(s) 306 and a plurality of interfaces 308 for connection to other devices in the network 101. The interfaces 308 also permit use of the recommendation server 302 with other network apparatus such as LANs, routers and other packet network devices, network management and provisioning systems, local PCs, etc. Utilization of the recommendation server 302 with a PC or other such device is described subsequently herein in greater detail.

The storage device 304 of the recommendation server 302 is adapted to store a plurality of user profiles associated with individual users, CPE, etc. It is appreciated that any number of CPE 106 may employ the same recommendation server 302, and that several recommendation server 302 may be present at the headend to serve all of the CPE 106 connected thereto. Conversely, one CPE may interact with or utilize the functionality of several different recommendation engines/servers, such as in cases where one engine/server is busy or at capacity, and significant latency would occur (thereby degrading user experience) if the information required by the CPE were not retasked to another engine/server. Such may also be the case in equipment failure conditions; i.e., a given CPE 106 may fail over to an alternate or backup engine/server so as to avoid outages. Alternatively, a plurality of task-specific or heterogeneous engines/servers may be used by one CPE in combination; e.g., a first engine/server being configured to perform a particular processing task (such as for one category or source of content, or for metadata rendered in a first format), while one or more other engine/server combinations may be configured for processing complementary information (e.g., another source or category, metadata format, etc.), and so forth.

As illustrated, the recommendation server 302 runs the recommendation engine 250 on its digital processor(s) 306. Generally, the recommendation engine 250 comprises a set of computer programs specifically adapted to utilize information regarding user activities (in the form of one or more user profiles) to compile user-targeted content recommendations by employing one or more stored evaluation and recommendation algorithms that are: (i) dedicated to recommendation generation; (ii) optimized for the content and user profile evaluation tasks, and (iii) which provide rapid convergence on content which is relevant to the selected user profile(s). This optimization and ability to rapidly converge advantageously allow for minimum latency in the recommendation and update process, thereby maintaining a desirable user experience (i.e., one where the user is not waiting any appreciable time for recommendation list generation or update, such as which may occur with prior art EPG refresh operations).

Other components which may be utilized within the server device 302 include amplifiers, board level electronic components, as well as media processors and other specialized SoC or ASIC devices. Support for various processing layers and protocols (e.g., TCP/IP, 802.3, DHCP, SNMP, H.323/RTP/RTCP, VoIP, SIP, LSCP, etc.) may also be provided as required. Where the content server is also acting in a local network capacity (e.g., as a VOD or application server), an appropriate application is also disposed to run on the server module 302 to provide a functional interface for e.g., VOD session requests received from the CPE or other interposed entities, such as an SRM. These additional components and functionalities are well known to those of ordinary skill in the cable and embedded system fields, and accordingly not described further herein.

It is also noted that the server device 302 may take any number of physical forms, comprising for example one of a plurality of discrete modules or cards within a larger network headend or edge device of the type well known in the art. The server 302 may also comprise firmware, either alone or in combination with other hardware/software components such as those previously described (e.g., disposed in the aforementioned edge device). The server module 302 may even include its own RF front end (e.g., modulators, encryptors, etc.) or optical interface so as to interface directly with various portions of the HFC network 101 if desired. Numerous other configurations may be used. The server device 302 may also be integrated with other types of components (such as satellite transceivers, encoders/decoders, etc.) and form factors if desired.

As yet another example, portions of the content distribution functionality may be rendered as a dedicated or application specific IC (ASIC) or DSP having code running thereon. For example, a security processor of the type well known in the art can be used to implement encryption algorithms on the delivered content, and/or to perform key pair generation and the like. Myriad different configurations for practicing the invention will be recognized by those of ordinary skill in the network arts provided the present disclosure.

The server operation can also be masked or controlled by a "business rules" engine" or other logical wrapper or layer as described subsequently herein.

As illustrated in FIG. 3a, the recommendation server 302 (and thus the recommendation engine 250) is in communication with a UAD 260. As noted above, the UAD 260 utilizes user action data to generate training records (discussed below) which are, in turn, utilized by the recommendation engine 250. The data used by the UAD 260 to generate training records is collected by various collecting entities 330. In the illustrated embodiment, the VOD servers 105 and BSA server 196 are responsible for collecting user action data. The VOD servers 105 are able to collect data regarding VOD content on a CPE 106 (such as via LCSP, "trick-mode" or other commands issued by the CPE during a VOD session with that CPE), while BSA server 196 collects data regarding other content selected at a CPE 106 (e.g., user tuning requests, number of CPE tuned to a given QAM/program channel, etc.).

Recommendation-Capable CPE—

In yet another embodiment of the invention (FIG. 3b), the user's CPE 106 comprises the necessary functionality and components to serve as a collecting entity 330, UAD 260, and recommendation engine 250, as opposed to a legacy CPE which does not have the aforementioned functionality and/or components.

Figure 3B:
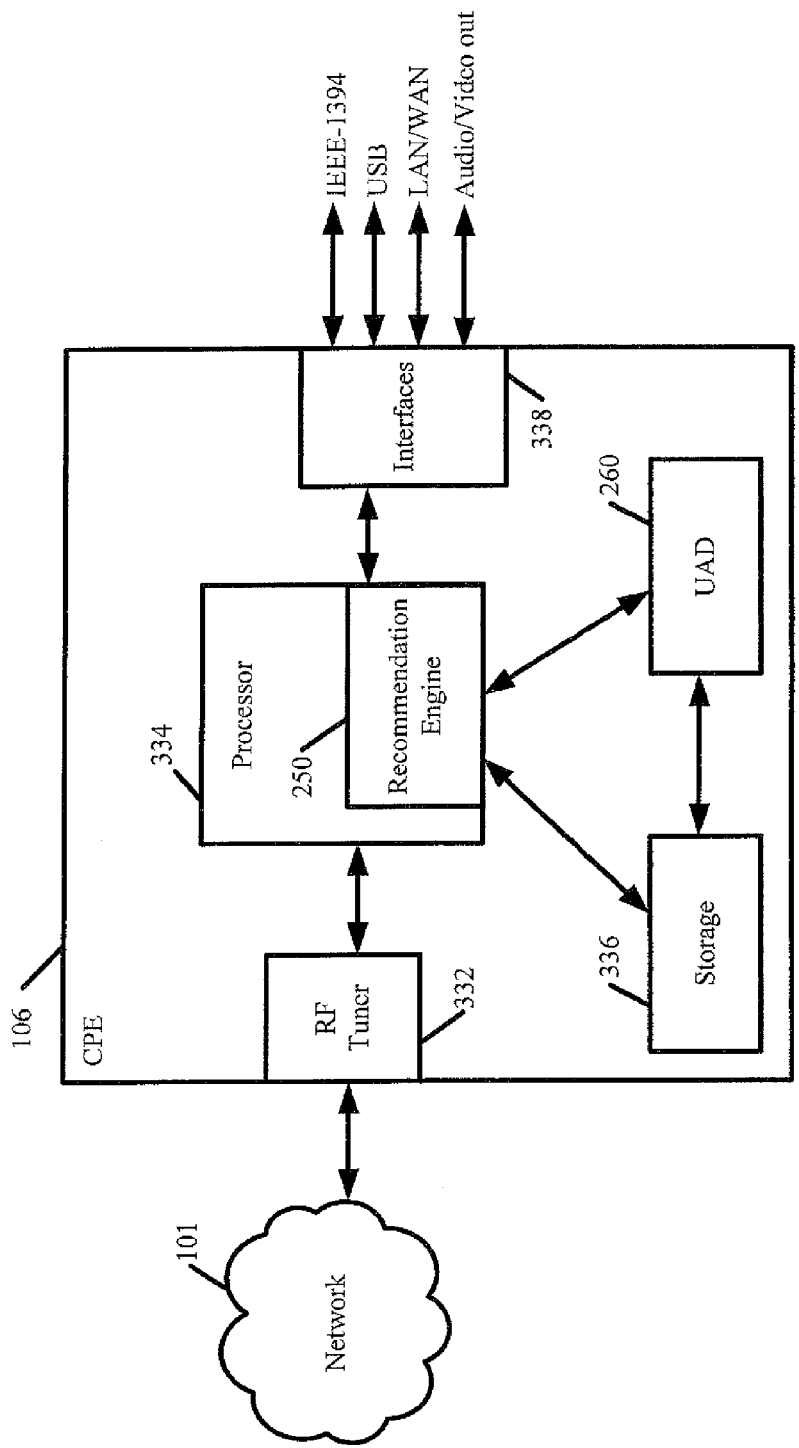
FIG. 3b is a block diagram of one embodiment of consumer premises equipment (CPE) comprising a recommendation engine according to the present invention.

As shown in FIG. 3b, the CPE 106 generally comprises a computerized system (e.g., embedded DSTB, converged premises device, etc.) having an RF tuner 332 for interface with the delivery network 101, digital processor(s) 334, a storage device 336, and a plurality of interfaces 338 such as video/audio interfaces, IEEE-1394 "FireWire", USB (e.g., USB 2.0, 3.0), serial/parallel ports, etc. for interface with other end-user apparatus such as televisions, personal electronics, computers, WiFi or other network hubs/routers, etc.

The user actions occurring on the CPE 106, whether by remote control unit or directly on the CPE front panel, etc. will be stored at the storage entity 336, and utilized by the UAD 260. The data analyzed by the UAD 260 is then sent to the recommendation engine 250 (such as via interprocess message, pointer to a designated storage location, etc.), and the profile-specific recommendations are generated and displayed to the user via the user's connected display device (e.g., television, PC monitor, LCD screen, etc.).

Other components which may be utilized within the device 106 (deleted from FIG. 3b for simplicity) include various processing layers (e.g., DOCSIS MAC or DAVIC OOB channel, MPEG, etc.) as well as media processors and other specialized SoC or ASIC devices. A separate cable modem (e.g., DOCSIS) tuner may also be included for receiving downstream cable modem signals over the coaxial cable. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

It is also appreciated that although only one tuner 332 is depicted, other embodiments of the present invention may comprise multiple tuners 332 and/or a wideband or ultra-wideband tuner, such as that described in co-owned and co-pending U.S. patent application Ser. No. 11/013,671 previously incorporated herein.

The aforementioned recommendation engine 250 may also be present on CPE comprising a multi-function or converged premises device (CD), such as that described in co-owned and co-pending U.S. patent application Ser. No. 11/378,129 filed Mar. 16, 2006 and entitled "Method and Apparatus for Centralized Content and Data Delivery", herein incorporated by reference in its entirety. The aforementioned exemplary CD comprises a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface; metadata associated with personal and DVR content such as video, music and photos throughout the premises via may also be utilized. Telephony services utilizing e.g., embedded multimedia terminal adapter (eMTA) and/or WiFi architectures may also be provided via the device 106; these services can make use of the network operator's indigenous VoIP or comparable telephony capability if desired, thereby providing an even more unified service environment and a mechanism for the various devices to communicate and interact with one another.

Figure 3C:
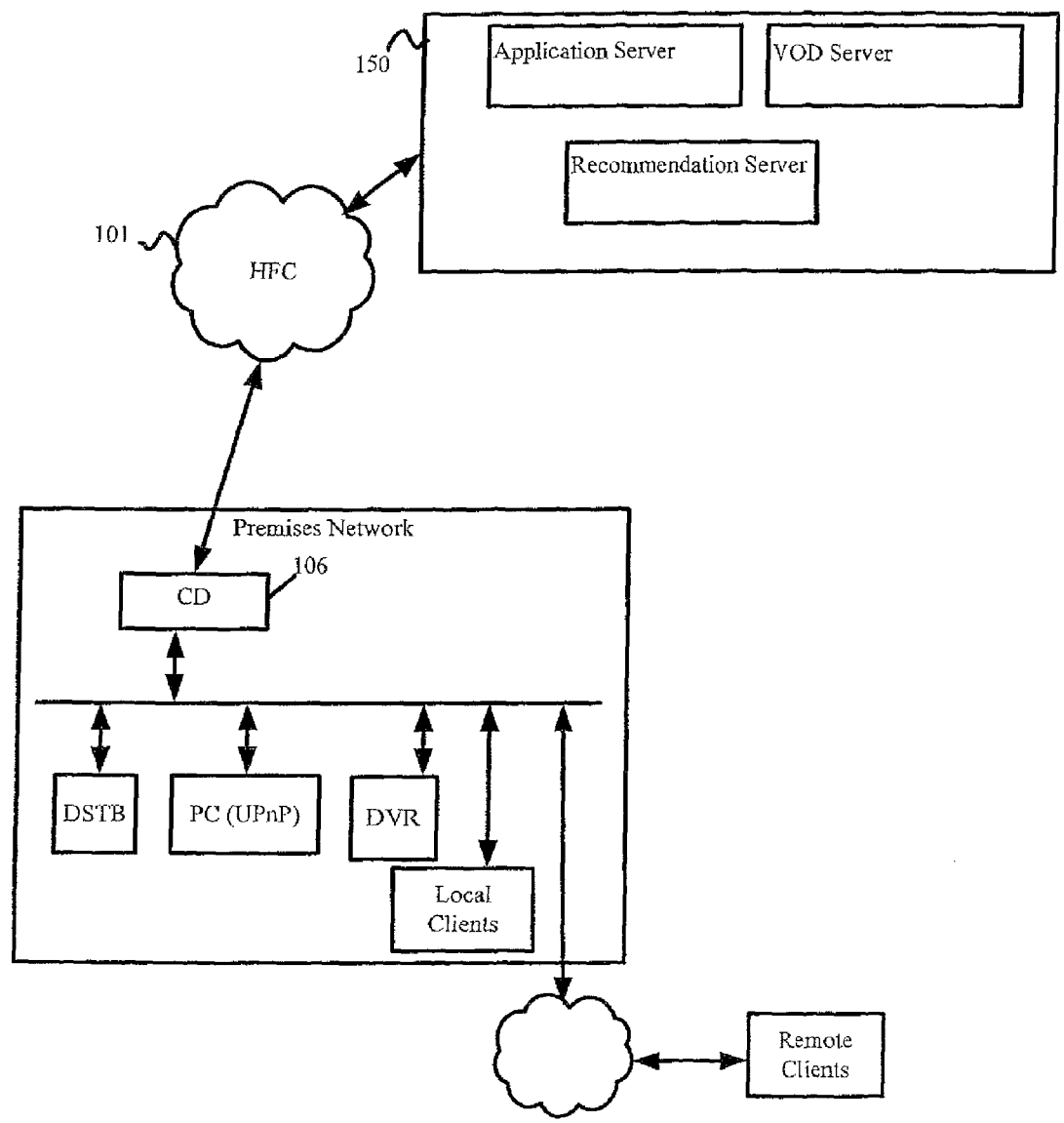
FIG. 3c is a block diagram of another embodiment the invention, wherein a converged device (CD) and backend (premises) network are used in conjunction with a network-based recommendation engine and application/VOD servers at the headend.

FIG. 3c illustrates yet another use of the converged device (CD) and backend (premises) network, including remote devices, in conjunction with a network-based recommendation engine and application/VOD servers at the headend.

Figure 3D:
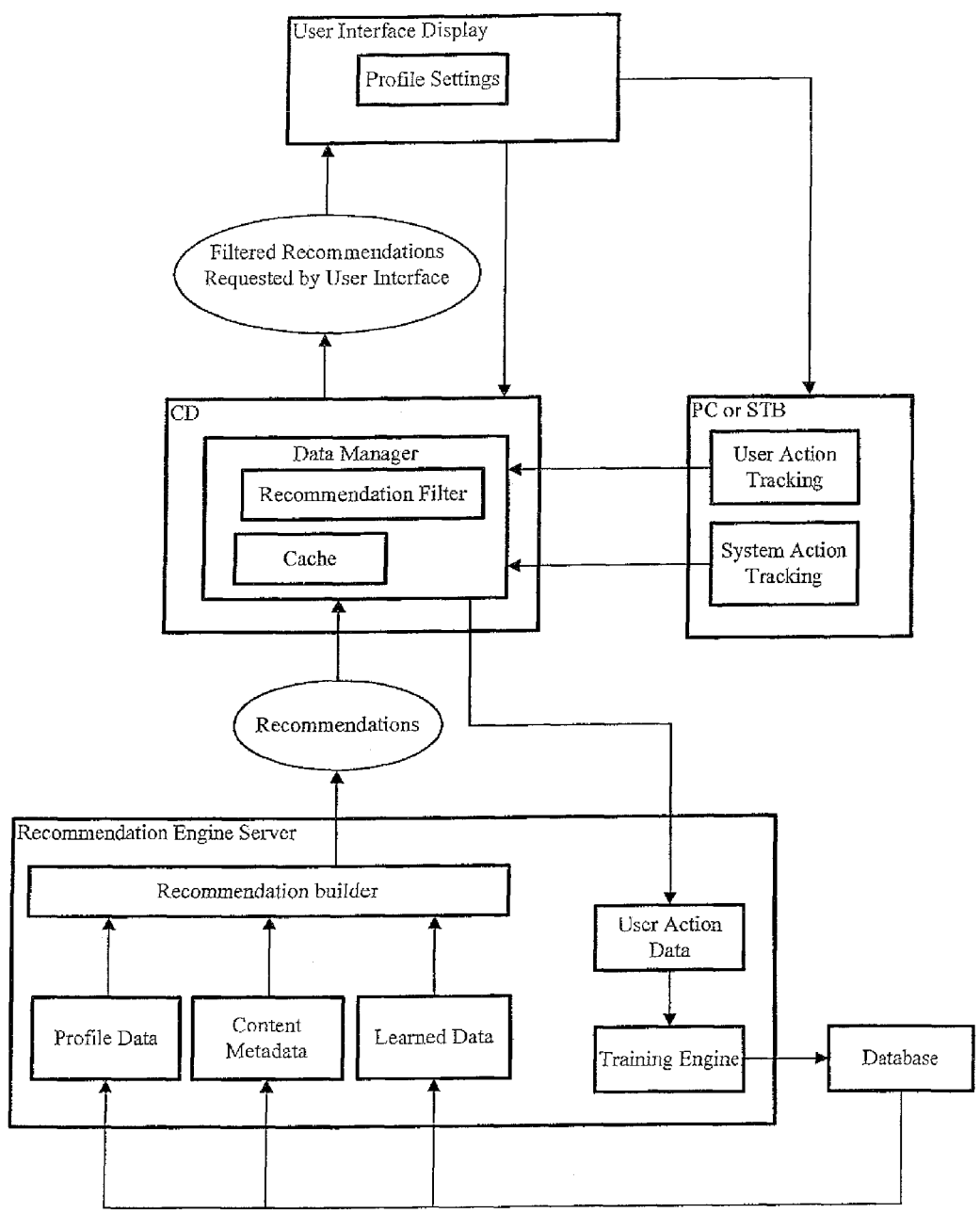
FIG. 3d is a block diagram illustrating the functional relationships between various recommendation engine system components in the context of the exemplary architecture of FIG. 3c.

FIG. 3d illustrates the functional relationships between various recommendation engine system components in the context of the exemplary architecture of FIG. 3c.

In another embodiment, a wired home network utilizing existing coaxial cable in the premises is created, by using e.g., an Ethernet-to-coaxial bridge technology based on the MoCA specification. According to this embodiment, existing premises devices and DVRs (i.e., those not having recommendation engines 250) are permitted to connect and share targeted content with a CPE 106 via a logical connection to its recommendation engine 250.

Exemplary methods and apparatus for the establishment of a home network and the ability of the CPE 106 to share or transfer protected content to devices connected in to the home network are described in co-pending and co-owned U.S. patent application Ser. No. 11/592,054 filed Nov. 1, 2006 and entitled "Methods and Apparatus for Premises Content Distribution", incorporated herein by reference in its entirety. In one salient aspect, the application provides a mechanism for devices connected to a home network to exchange information, and ultimately share or transfer protected content (including for example audiovisual or multimedia content, applications or data) in a substantially "peer-to-peer" fashion and without resort to a central security server or other such entity. Authorized "browsing" of the content present on one device by another device is also provided.

In yet another embodiment, the CPE 106 is advantageously accessible via any remote device with internetworking (e.g., Internet) capability. The recommendation engine 250 of the CPE 106 of FIG. 3b may be configured such that a user can access the user's profile and associated playlists in different ways; e.g., (i) "directly" or (ii) "over the network." The direct control to a user may be in the form of a remote control, or control switches and buttons (e.g., volume control knob) on the CPE. This is accomplished while the user is at the same premises where the CPE is located.

Alternatively, accessing a user profile "over the network" may be accomplished by a user configuring the device 106 by accessing its controls and the recommendation engine via a network connection. The recommendation engine 250 of the CPE 106b is adapted accordingly and thereby allows content and profile associated therewith to be accessed by a user from outside the premises. Exemplary devices which can be used remotely to access the CPE via its network connection include laptop computers, personal computers, cellular telephones, PDA and other hand-held electronic equipment. For instance, in one variant, a small client application is disposed and runs on the mobile/remote device; the client application uses a TCP/IP transport and its higher layer processes to communicate with a "server" application running on the CPE 106, the latter adapted to provide data and communications between the remote device and the recommendation engine (and other associated functions necessary to allow the user to configure their CPE remotely).

In another embodiment, the recommendation engine 250 of the CPE 106 may contain programs which allow interactivity with other client devices 106. For example, a management entity (not shown) present on the CPE 106 may be adapted to communicate and interact with that of another CPE 106. Examples of such programs include UPnP application, a program guide, and so on. The CPE may also operate in a "peer-to-peer" (P2P) type of architecture, wherein processing assets (e.g., pre-processed recommendations, profiles, etc.) can be shared between two or more CPE at the edge of the network, thereby obviating significant involvement by the core (and attendant bandwidth usage). See, e.g., co-owned and co-pending U.S. patent application Ser. No. 11/726,095 entitled "Method and Apparatus for Content Delivery and Replacement In a Network" filed Mar. 20, 2007 and incorporated herein by reference in its entirety, for one exemplary approach to CPE P2P interactions and management that may be used consistent with the present invention.

Recommendation Engine Algorithms—

In one embodiment, the recommendation engine 250 comprises software adapted to generate content records from metadata associated with the plurality of content elements (e.g., movies, trailers, advertisements, etc.) received. The operation of this software in processing metadata and user profiles, and generating recommendations, is now described in detail.

Generating Content Records—

As previously noted, the metadata associated with a given content element is used by the recommendation engine 250 as the basis of generating content records. This metadata may comprise any format useful for the engine (e.g., XML, HTML, plain text, etc.), and in one variant comprises a standardized format and protocol such that engines of varying origin and type can none-the-less read and utilize the metadata effectively. For instance, the metadata standardized format may require that certain content descriptors are arranged in a file or data record in a prescribed order so as to be directly compatible with a content record format (see, e.g., the exemplary content record format of Appendix A hereto), and that only certain types and ranges of variables can be used. The standard protocol might require, for example, that the metadata is always packaged in a prescribed file structure or hierarchy, placed at a certain point within the content file or transmission stream, etc. Such details are readily within the skill of those of ordinary art in the programming fields, and accordingly are not described further herein.

In one embodiment, the metadata may be of the type disclosed in Metadata 2.0 Specifications Video On-Demand Content Specification Version 2.0 (MD-SP-VOD-CONTENT2.0-I02-070105)© Copyright 2006-2007 Cable Television Laboratories, Inc. which is incorporated herein by reference in its entirety. Exemplary metadata may be of the type described at e.g., page 15 thereof which illustrates title asset metadata. As disclosed therein metadata describes the attributes of a piece of content (e.g. actors, genre, length, is it HD, is it first run or re-run, etc.).

FIG. 4a illustrates a simplified example of an exemplary content record 400 for a discrete piece of content, Content A. The content record 400 for Content A is expressed as a vector, $V_a$, having any number, n, of elements 402. The exemplary content record 400 is a one-dimensional directional matrix of values and, although illustrated as a column vector (n×1), may alternatively be expressed as a row vector (1×n; see FIG. 4e). Each element 402 of the content record 400 corresponds to individual ones of various aspects of the content examined. Thus, the content record 400 reflects the status of Content A with regard to the particular aspects considered.

In the illustrated embodiment, the elements 402 of the content record 400 comprise either a (binary) "1" or a "0". According to this model, a "1" indicates that the content includes the examined aspect; and a "0" indicates that the content does not. It is appreciated, however, that other symbols, numbers and values (including non-binary schemes) may be used to indicate an individual piece of content's status or attributes with regard to a particular aspect consistent with the present invention. For example, the system may utilize "+" and "−", "yes" and "no", "true" and "false", etc. Alternatively, aspects may be examined by varying degrees, thus requiring symbols, etc. having an inherent linear or non-linear relationship to one another (e.g., a number from among counting numbers such as 1, 2, 3, 4, 5 . . . or from among positive and negative numbers such as . . . −2, −1, 0, 1, 2 . . . ), or even fuzzy logic systems (e.g., "Very little"; "Somewhat"; "Very much", etc.).

A reference record 410 comprising a reference vector, $V_{ref}$, is illustrated in FIG. 4b. The reference record 410 is stored in the storage associated with the processor 220 on which the recommendation engine 250 is run, and contains information regarding what aspects 412 the recommendation engine 250 examines, and in what order an element 402 associated with each aspect 412 will appear in a content record 400. Accordingly, the reference vector, $V_{ref}$, is comprised of the same number, n, of aspects 412 as the number, n, of elements 402 in the examined content's content vector, $V_a$.

FIG. 4c demonstrates an exemplary content record 400a for the movie "Notting Hill" given the reference record 410a. As illustrated, the elements 402a of the content record 400a have a one-to-one correlation with each aspect 412a of the reference record 410a. Accordingly, the "1" given as the first element 402a in the content record 400a for the movie "Notting Hill" indicates that the movie's status is positive for being a comedy (the first aspect in the reference record 410a); the second "1" demonstrates that "Notting Hill" is a romance or at least has significant romantic content, and so forth.

Alternatively, as illustrated in FIG. 4d, an exemplary content record 400 for a discrete piece of content, Content B, may be expressed as an n×2 column vector. As illustrated, the content record 400b for Content B, $V_b$, may still comprise any number, n, elements 402b and further comprises examined aspects 412b and their respective elements 402b. Each element 402b once again corresponds to individual ones of various aspects 412b examined. Thus, the content record 400b reflects the status of Content B with regard to the particular aspects 412b considered and does not require the use of a reference vector 410.

As noted above, a content record 400c may also be expressed as a 1×n vector as shown with respect to the exemplary content the movie "Notting Hill" (see FIG. 4e). It is appreciated that according to this embodiment, a reference vector 410 is not required, as the content record 400c gives only the aspects 412c which are applicable to the content. In other words, the content record 400c lists only aspects 412c which would have rated a "1" (such as comedy, romance, etc.) and skips or omits those aspects 412c which would have rated a "0" (such as action, horror, etc.), thus avoiding ambiguity.

Referring back again to FIG. 4c, the recommendation engine 250 may take into account a plurality of different aspects including, inter alia, genre (e.g., comedy, romance, action, horror, etc.), epoch of the movie and/or its theme (e.g., filmed or released in the 1970's, 1980's, 1990's, and/or dealing with a particular period of time, etc.), actor (e.g., Hugh Grant, Bruce Willis, etc.), and content source (broadcast, on-demand, website, DVR, etc.). Moreover, each of these aspects may comprise one or more sub-aspects; e.g., within the aspect of "comedy", sub-aspects might comprise "stand-up", "slapstick", "situational (sitcom)", and so forth.

The various aspects 412 which are analyzed by the recommendation engine algorithms fall into one of several categories. For example, several aspects 412 may be examined which fall into the category of "genre", including, inter alia, comedy, romance, action, horror, sports, adult, etc. Other aspects 412 may be descriptive of a content source, such as VOD, broadcast, DVR, etc. Appendix A hereto lists several exemplary aspects 412 and their related categories. It is noted, however, that Appendix A is not intended to be an exhaustive list, and that a recommendation engine 250 may track other categories and/or aspects 412 as well.

Accounting for these and other aspects of each of a plurality of content advantageously permits the recommendation engine 250 to quickly scan individual content elements (by way of their records) for comparison operations, including comparison of content to other content (to generate lists of content having varying degrees of similarity to selected content), and comparison of content to a user profile (to generate lists of user-targeted content), both of which will be discussed in greater detail below.

It will also be recognized that a particular piece of content (e.g., movie, advertisement, FVOD clip, etc.) is in no way limited to one content record. For example, in one variant, the recommendation engine 250 is adapted to generate different types or forms of content records for different uses, such as where both a "fall" (i.e., using all of the metadata provided) and "reduced" (using only a subset of the metadata) content record are both generated for use under different circumstances. Alternatively, a row-based record (versus column-based matrix) may be generated to add flexibility or compatibility with row-based user profile records. As yet another alternative, the content may have multiple distinct sets of metadata provided with it (e.g., one each from multiple different sources), thereby resulting in multiple content records.

Generating User Profiles—

As discussed above, in one embodiment, the recommendation engine 250 comprises software adapted to generate one or more user profiles for each CPE 106, user, or group of users. The software further provides for the user profiles to be dynamically updated based on, inter alia, user actions.

Figure 5C:
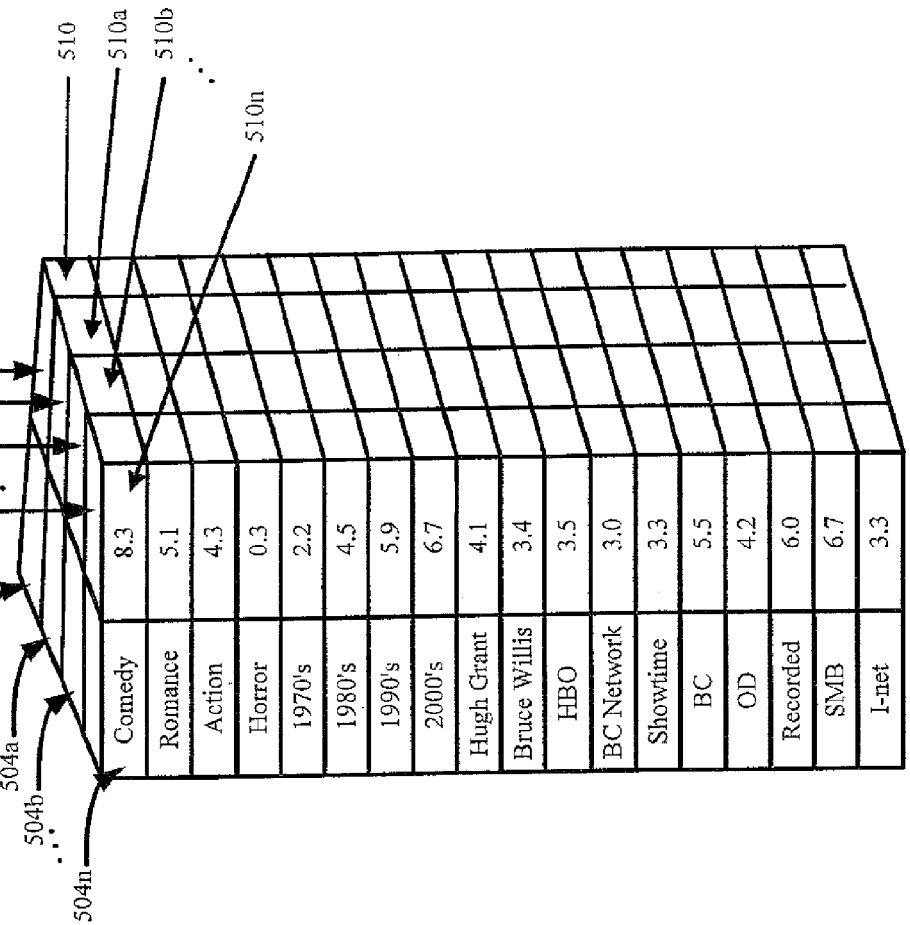
FIG. 5c is a graphical representation of an exemplary user profile stack, represented as several 2×n column vectors, for use in the recommendation engine of the present invention.
Figure 5A:
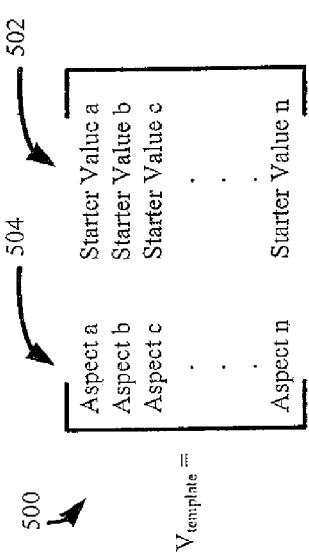
FIG. 5a is a graphical representation of an exemplary user profile template, represented as a 2×n column vector, for use in the recommendation engine of the present invention.

In one exemplary embodiment, the user profiles of the present invention are not manually entered, but rather prior to any content-related user actions, a user profile template 500, as depicted in FIG. 5a, is given. The user profile template 500 gives starter or initial values 502 for various aspects 504 examined in the profile. Then, as the user views programs, the system immediately begins shifting away from the given starter values 502 to reflect a user's preferences in the form of weighted sums, as will be discussed subsequently herein. It is noted that in an alternative embodiment, a user may be prompted to enter user profile information (such as via a quick on-line or other questionnaire), and/or alternative methods for providing a user profile may be utilized (such as for example provision of a user-specific descriptive file or data structure akin to the content metadata which the MSO might generate based on user sign-up, demographic, or historical activity information for that user). A third party "profiler" might also be used, wherein this third party collects publicly available data, and public or private data the MSO might have one the user (assuming user assent in the case of private data), in order to generate a "best guess" initial template for that user. As yet another alternative, the MSO or third party provider might generate a set of starter templates that span the demographics of the viewing audience at least to some degree of granularity; say, e.g., 100 profiles that might comprise descriptions such as "Young Professional" or "Single Mother" from which the user can simply pick the most appropriate for their personal situation. Myriad different approaches will be envisioned as well by those of ordinary skill given the present disclosure.

Figure 5B:
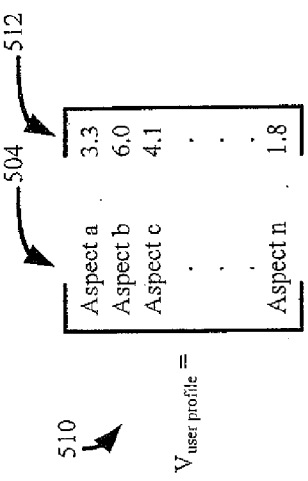
FIG. 5b is a graphical representation of an exemplary user profile, represented as a 2×n column vector, for use in the recommendation engine of the present invention.

Referring now to FIG. 5b, an exemplary user profile 510 is presented. The exemplary user profile 510 shows a 2×n vector as described with respect to FIG. 4d above; however, any of the alternative vector embodiments discussed above may be utilized. The user profile 510 of FIG. 5b is comprised of various aspects 504 and their respective weighted sums 512.

It is appreciated that the recommendation engine 250 of the present invention may be configured to utilize two or more profiles 510 for each user or CPE 106 (or other user device) connected thereto. In one variant, the recommendation engine 250 may compile one or more user profiles 510 for each user of a particular COPE 106. For instance, in a two-user premises (e.g., husband and wife living together), each of the husband and wife may have multiple profiles associated with their user identity, such multiple profiles being useful for capturing different particular moods or behaviors of that individual (e.g., "had a had day at work" profile, which might more heavily weight comedy or light fare, or "scary" for when that user wants a high level of scary, horror, extraterrestrial, or supernatural-related content). The recommendations generated by the engine 250 when based on these different profiles might be markedly different; such use of the different user profiles thereby allows the user to fine-tune the content recommendations generated by the engine to their particular current situation.

In another variant, the one or more multiple profiles 510 for each user are employed so as to form a composite profile 510 for a particular COPE 106 or device; various weighing scales may be applied to each profile 510 to generate the composite profile 510. For instance, if the viewer of the content is predominantly the husband (due, e.g., to the wife's frequent travels, or lack of interest in television programming in general), then a 75%/25% weight might be applied to the husband's profile(s) and the wife's profile(s), respectively.

Further, the recommendation engine 250 may be adapted to maintain user profiles 510 segmented by day and/or by parts of the day, times of the year, correspondence with special events (such as birthdays, holidays, etc.). In other words, each user profile 510 in this embodiment contains a certain number of day and/or part-of-the-day segments tailored to reflect viewing patterns of various portions of the day and week. For example, a user profile 510 may comprise, inter alia, a segment for weekday mornings, weekday afternoons, weekday primetime, weekday late-night, Saturday mornings, Sunday mornings, weekend afternoons, weekend primetime, and weekend late-night. It is also appreciated that various other segments, not given above, may be encompassed by a user profile 510, as well.

The aspects 504 of the exemplary user profile 510 of FIGS. 5a and 5b are similar in type to the aspects 412 discussed above with respect to the content records 400.

The weighted sums 512 of the profile of FIG. 5b represent a "score" for each aspect 504; these are calculated by accumulating usage history and other learned data. Calculation of the weighted sums 512 and the utilization of learned data will be discussed in greater detail below. The weighted sums 512 are advantageously adapted to accurately reflect shifting user trends, because the weighted sums 512 are recalculated or updated when a user acts (and in some instances when a user fails to act), which may be as frequent as every action taken by the user (e.g., each pause/rewind of a VOD session, channel change, failure to tune away during a prescribed time period, etc.). In one embodiment, the sums 512 are recalculated less frequently, such as for example once every few hours, once a day, once a week, at shutdown/startup, etc. According to these embodiments (not shown), data regarding each individual user action will be saved for calculation at that time, whether in a local storage device on the user's CPE or at a network entity such as the recommendation server 302 of FIG. 3a.

Updating of the user profile 510 generally comprises creating a new user profile 510a, 510b . . . 510n (having updated weighted sums 512a, 512b . . . 512n) at every update instance (e.g., every user action, etc. as described previously). As time progresses, multiple user profiles 510a, 510b . . . 510n, referred to collectively as "user profiles 510", are created and stored on top of one another as illustrated in FIG. 5c. Each of these profiles 510 in the illustrated embodiment represents a point in time, or epoch, and is weighted based on that epoch to create a cumulative profile 510n. In other words, according to one exemplary scheme, profiles 510 which are more recent (i.e., have more recent epochs) will have more weight than those which are older in order to maintain the system up to date with a user's changing preferences. This is based on the assumption that the most current data is the most useful/relevant. However, it is recognized that there may be circumstances where the most recent data is not the most relevant (or at least may need to be supplemented by older data), such as where the recent data generates ambiguities or conflicts, or frustrates generation of clearly distinguished recommendations.

Cumulation of the profile is accomplished in the illustrated embodiment by multiplying the value of the weighted sum 512 of each profile 510 by a weighing factor determined by the epoch for that profile 510. The cumulative profile 510n is utilized by the recommendation engine 250 as discussed above. The cumulative profile 510n is termed "cumulative" because it takes into account each of the previous user actions stored in previous profile 510. It will be appreciated, however, that portions of the user's prior behavior may be excised or purged from the profile, such as through use of a "moving window" technique; i.e., where only the last or most recent X amount of data is retained, or where only a selected subset of data (i.e., that correlating to ideal collection conditions and with no ambiguity or conflicts) is retained. In this fashion, the profile can be groomed by the MSO so as to eliminate nonsensical or bad data, data which is too old, etc.

Data Collection and the Learning Process—

As referenced above, data that the recommendation engine 250 learns from the user is acquired via appropriate client software running on the user's CPE (or from other network entities, such as VOD server processes or BSA switches). The learned data generally may be derived from explicit and implicit user actions.

A user action is any action (whether active or passive) taken by a user with regard to content. Typical active user actions include, but are not limited to: (i) setting a reminder timer; (ii) viewing broadcast content to completion; (iii) setting content to record; (iv) viewing recorded content to completion; (v) rejecting content offered by the recommendation engine 250; (vi) searching for content; (vii) aborting viewing by turning off; (viii) aborting viewing by navigating to other content; (ix) aborting viewing and subsequently resuming; (x) navigating to or away from content relative some amount of time; (xi) viewing content to completion, but failing to continue viewing related content (other episodes); (xii) setting language preferences; and (xiii) setting closed captioning; etc. User actions also include instances where the user fails to take any action (i.e., an opportunity for action was offered, but no action was taken, or a prescribed event or period of time has elapsed, with no input or change by the user).

In the present context, implicit user actions comprise actions that users take with regard to content (or titles, clips, etc. representing the content) which do not provide affirmative or explicit feedback or data on the user's opinion. Some implicit user actions may be positive or indicative of a general acceptance or interest in the content, while others are negative or indicative of dislike or lack of interest. For instance, a user tuning away from a commercial may indicate a dislike or disinterest in the advertisement's subject matter; however, it may also indicate that the user simply dislikes advertisements in general. Similarly, a user terminating a VOD stream midway without resumption might indicate that the user dislikes the movie, but it may just as reasonably result from the user being too tired to watch further, having a family emergency, becoming aware of other more interesting content, etc. Hence, the MSO can infer certain attitudes or opinions from implicit user actions, but these inferences are not always reliable.

Explicit user actions comprise overt data, impressions or reactions given by a user to content. The implicitly and explicitly learned data is dynamically collected and utilized by the illustrated embodiment of the present invention to update a user profile 510 such that immediately after a user action has occurred, the recommendation engine 250 is able to generate better playlists, recommendations, suggestions, etc. which more precisely match the user's profile 510. One example of explicit user action is direct feedback on watched content. Thus, after a program ends (or at the first instance of the user navigating away from the content), the user may be presented with a user interface (e.g., GUI) wherein the user instructs the recommendation engine 250 as to their preferences (e.g., "Find more like this", "Don't recommend again ever", "Don't recommend for 6 months", "Recommend again", etc.). It is also appreciated that at the interface, the user may be given options to rate content. Content may be rated by using, inter alia, "thumbs up" or "down", one or more stars, a numbering system (e.g., 7 out of 10), a fuzzy model (e.g., "poor", "fair" "excellent"), etc.

As previously mentioned, the weighted sums 512 of the user profile 510 give a score for each aspect 504 of content examined; the scores are continually recalculated based on learned data. Data is learned from the actions a user takes (user actions) and his usage history (i.e., learned data is cumulated over time).

It is noted that system actions may also be taken into account to determine, for example, when content has been present on a user's DVR for an extended period of time, but has not been viewed. User inaction will be utilized in so much as it is relative to an affirmative user action. For example, the user profile 510 may not be adjusted when the user has not viewed anything (i.e., the stored content, or otherwise) in a large amount of time. In other words, at times of extended user inactivity, the weighted sums 512 of the user profile 510 may remain in place, rather than be replaced with zeros or return to the template 500 starter values 502. This prevents the recommendation algorithms from "hunting" or being skewed based merely on user inactivity, which may simply be the result of the user going away on vacation, etc. and not indicative of any change in thinking or preferences.

As indicated previously, a single profile may be representative of several users viewing habits, as opposed to those of a single person. For example, a household may have various temporal profiles, i.e., profiles related to the time of day and/or day of the week, such as weekday morning, weekday afternoon, weekday evening, weekday late evening, weekend morning, etc. In this embodiment, the system may be adapted to learn not only based on the users' actions, but also based on the time of day and day of the week. So that a user's action (or inaction) will be reflected in the household profile accordingly.

In another embodiment, the learning process may be halted or interrupted such as by providing a user the opportunity to have his/her actions not used as discussed above. Such halting or interruption may be used, for example, if a new person (not a household member or user of the profile) is viewing the television. In yet another embodiment, the system may provide a user with the opportunity to select that he/she is a "Guest" and not a frequent user of the system thereby interrupting the learning process discussed herein. A "Guest" may optionally further be provided an opportunity to have data generated from his/her actions on a system which he/she is not a user sent to his/her personal system for use thereon.

A PIN or password protection system or other such security measure may also be utilized to protect access to a user profile.

Generating Training Data—

In the illustrated embodiments, user actions are stored in a UAD 260, such as the exemplary UAD 260 shown in FIG. 6. The UAD 260 is comprised of various software applications as discussed below.

In the embodiment of FIG. 6, the UAD 260 is in data communication with a recommendation engine 250, and a collection entity 330. In cases where the CPE 106 comprises the collection entity 330, the CPE can be in direct communication with the UAD as well (not shown). Although only one of each of the foregoing devices is shown in the simplified illustration, it is appreciated that any number of recommendation engines 250, CPE 106, and/or collection entities 330 may be associated with a particular UAD 260. Conversely, more than one UAD may be associated with each collection entity and/or recommendation engine. Also, as noted previously, collection entities 330 in the exemplary embodiment of FIG. 6 may comprise for example CPE 106, VOD servers 105, and/or BSA servers 196. It is also noted that, in alternative embodiments, one or more of the given entities may be co-located and/or may comprise a single device. Hence, the architecture of FIG. 6 is merely illustrative of the general principles.

The UAD 260 is comprised of a user action tracking cache 602 and a tracking engine 604, each having appropriate software applications to perform the described functions. The user action tracking cache 602 temporarily stores user action data, making it easily accessible to the tracking engine 604 for calculations. User action data is transmitted from user CPE 106 or other data collecting entity 330 and stored at the cache 602 as data sets having in one embodiment at least a user action identifier, a content or asset identifier, and information regarding the day and time. This data may be formatted into a message by the CPE 106 or the collection entity 330 (such as via the protocol stack running on such devices), or provided in raw or streamed format, and buffered and formatted at the UAD. Any number of such different approaches may be used consistent with the invention.

Accordingly, when a user takes an action (or another prescribed condition triggers the need to collect data), data regarding that user action is sent from the collecting entity 330 to the user action tracking cache 602 of the UAD 260 via the interface 606 and network 101 (as necessary). At the cache 602, via one or more software applications, the user actions are assigned an expiration date such that once the user action is taken into account, it will not be re-used. This avoids allowing a single, aberrational user action from having a lasting effect. Then, user action data is transferred from the user action tracking cache 602 to the tracking engine 604.

At the tracking engine 604, scores are continuously calculated for every user action, and the user action data is correlated to the content acted upon via appropriate software applications. Training data, or data calculated from the user actions, is then sent to the recommendation engine 250, which uses the training data to update one or more user profiles 610.

Calculations in one embodiment are based on: (i) the classification of the user actions as negative or positive relative the content acted upon, and (ii) the degree to which the action is indicative of the user's preferences. Accordingly, the various user actions are positively and negatively weighted such that those user actions having a stronger known correlation to user preferences are given more weight than those that do not.

Table 1 presented below gives an exemplary weighting system for various ones of the aforementioned user actions; however, other systems may be utilized consistent with the invention as well.

TABLE 1

| Action | Type | Weighting Factor |
| --- | --- | --- |
| View to Completion | positive | +2 |
| Set recording | positive | +1.5 |
| Stop recording | negative | −1.5 |
| Schedule recording | positive | +0.8 |
| Remove scheduled recording | negative | −0.8 |
| Reject recommended offer | negative | −1.5 |

TABLE 1-continued

| Action | Type | Weighting Factor |
| --- | --- | --- |
| Abort viewing - turn off | negative | −1.0 |
| Abort viewing - switch content | negative | −1.5 |
| Search content | positive | +2 |
| Set Language | positive | +3 |
| Set Closed Captioning | positive | +3 |
| Set reminder timer | positive | +0.8 |
| Remove recorded content | negative | −2 |

As noted above, content-correlated scores are constantly calculated by the tracking engine 604 by multiplying the content vector of the content acted upon by a weighing factor determined by the action taken. For example, suppose a user searches for "The Simpsons" and, for ease of explanation, assume the content "The Simpsons" has a content record 400 represented by the vector, $V_{Simpsons}$, given below:

$$V_{Simpsons} = \begin{bmatrix} action & 0 \\ comedy & 1 \\ animated & 1 \\ horror & 0 \\ OnDemand & 0 \\ Broadcast & 1 \\ DVR & 0 \end{bmatrix} \quad \text{Eqn. 1}$$

First, an entry into the user action tracking cache 602 of the UAD 260 will be created, the entry comprising, inter alia, the content record 400 given above. Assuming the weight given to the positive, active user action of "searching" is +2 (see Table 1), the content record 400 will be updated to reflect that action by multiplying the content record 400 vector by +2. Thus, the vector $V_{Simpsons}$ would be updated such that the individual elements 402 are multiplied by the weighing factor as shown in Eqns. 2-4 below:

$$V_{Simpsons}(updated) = V_{Simpsons} \times \text{weighing factor} \quad \text{Eqn. 2}$$

$$V_{Simpsons}(updated) = \begin{bmatrix} action & 0 \\ comedy & 1 \\ animated & 1 \\ horror & 0 \\ OnDemand & 0 \\ Broadcast & 1 \\ DVR & 0 \end{bmatrix} \times 2 \quad \text{Eqn. 3}$$

$$V_{Simpsons}(updated) = \begin{bmatrix} action & 0 \\ comedy & 2 \\ animated & 2 \\ horror & 0 \\ OnDemand & 0 \\ Broadcast & 2 \\ DVR & 0 \end{bmatrix} \quad \text{Eqn. 4}$$

The training vector, $V_t$, is a vector similar to a user profile 510, and is stored by the tracking engine 604. Updated content vectors, generated at each user action, are added to a previous training vector to update it. In one embodiment, prior to any user activity, the system provides an empty training vector which is updated and adapted given subsequent user actions. An exemplary training vector is given below by Eqn. 5.

$$V_t = \begin{bmatrix} action & 2.3 \\ comedy & 3.7 \\ animated & 1.5 \\ horror & 0.4 \\ OnDemand & 2.2 \\ Broadcast & 9.1 \\ DVR & 4.5 \end{bmatrix} \quad \text{Eqn. 5}$$

Continuing the example given above, when a user searches for "The Simpsons", the training vector is updated. Thus, where the training vector showed a comedy aspect of 3.7 and "The Simpsons" updated content vector showed a comedy aspect of 2, the updated training vector will now give a comedy aspect of 5.7, as demonstrated by Eqns. 6-8 below:

$$V_t(updated) = V_t + V_{Simpsons}(updated) \quad \text{Eqn. 6}$$

$$V_t(updated) = \begin{bmatrix} action & 2.3 \\ comedy & 3.7 \\ animated & 1.5 \\ horror & 0.4 \\ OnDemand & 2.2 \\ Broadcast & 9.1 \\ DVR & 4.5 \end{bmatrix} + \begin{bmatrix} action & 0 \\ comedy & 2 \\ animated & 2 \\ horror & 0 \\ OnDemand & 0 \\ Broadcast & 2 \\ DVR & 0 \end{bmatrix} \quad \text{Eqn. 7}$$

$$V_t(updated) = \begin{bmatrix} action & 2.3 \\ comedy & 5.7 \\ animated & 3.5 \\ horror & 0.4 \\ OnDemand & 2.2 \\ Broadcast & 11.1 \\ DVR & 4.5 \end{bmatrix} \quad \text{Eqn. 8}$$

Referring again to FIG. 6, after a prescribed condition is reached (e.g., a certain number of updates to the training vector, or at certain times during the day, etc.), the training vector will be sent via the interface 606 to the recommendation engine 250 in order to be utilized in updating the user profile 510.

At the recommendation engine 250, the training data is used to update the user profile $V_{user\ profile}$ 510 via one or more algorithms thereof. An exemplary user profile 510 is shown below in Eqn. 9.

$$V_{user\ profile} = \begin{bmatrix} action & 8.5 \\ comedy & 4.0 \\ animated & 2.2 \\ horror & 1.3 \\ OnDemand & 5.7 \\ Broadcast & 6.1 \\ DVR & 8.4 \end{bmatrix} \quad \text{Eqn. 9}$$

As discussed above, updating a user profile 510 comprises adding the training vector to the user profile 510 to create an updated or cumulative user profile 510n Aspects 504 in the user profile 510 for the current epoch will be adjusted relative to the content record 400 that the user acted upon, as shown below in Eqns. 10-12:

$$V_{user\ profile}(\text{updated}) = V_{user\ profile} + V_t(\text{updated}) \qquad \text{Eqn. 10}$$

$$V_{user\ profile}(\text{updated}) = \begin{bmatrix} action & 8.5 \\ comedy & 4.0 \\ animated & 2.2 \\ horror & 1.3 \\ OnDemand & 5.7 \\ Broadcast & 6.1 \\ DVR & 8.4 \end{bmatrix} + \begin{bmatrix} action & 2.3 \\ comedy & 5.7 \\ animated & 3.5 \\ horror & 0.4 \\ OnDemand & 2.2 \\ Broadcast & 11.1 \\ DVR & 4.5 \end{bmatrix} \qquad \text{Eqn. 11}$$

$$V_{user\ profile}(\text{updated}) = \begin{bmatrix} action & 10.8 \\ comedy & 9.7 \\ animated & 5.7 \\ horror & 1.7 \\ OnDemand & 7.9 \\ Broadcast & 17.2 \\ DVR & 12.9 \end{bmatrix} \qquad \text{Eqn. 12}$$

Referring now to FIG. 7, an exemplary method 700 of utilizing user actions to update a user profile 510 and to provide targeted recommendations is illustrated. Per step 702 of the Figure, the UAD 260 receives user action data from the collecting entity 330 (or CPE if applicable). The user action data is used, at step 704, to generate updated training data (e.g., an updated training vector). As discussed above, the training data is updated by first creating a content record 400, then multiplying the content record 400 by a weighting factor. The weighting factor will depend on the nature of the user action as expressed in the user action data received.

Then, at step 706, the updated training vector is used by the recommendation engine 250 (whether located at the headend, hub, or elsewhere) to generate an updated user profile 510. As discussed above, the user profile 510 is updated by adding the training data to the previous user profile 510.

At step 707, if there is a terminating user action, the system ceases operation. Alternatively, if there is no terminating action, the updated user profile 510 is utilized to generate recommendations (step 708). As previously discussed, this is accomplished via comparison of content records 400 to the user profile 510.

Then, at step 710, the recommendations are displayed or otherwise provided to a user. The recommendations may be displayed in the form of a playlist, a continuous stream on a virtual channel, an EPG, etc., or may be stored for later use or distribution to a connected device, such as by providing a flier, SMS message, e-mail, WAP push, etc. to a mobile/laptop computer, remote PC, etc. Any action taken by the user with respect to the displayed recommendations will be reported as user action data to step 702 of the method 700 assuming such mechanism exists. For example, in one embodiment of the invention, a portable client device such as a handheld or laptop may not contain the facility (e.g., client application and necessary communication medium) to provide update data to the collection entity 330, and hence user action data from use of that device relevant to the content is simply not collected. Alternatively, such devices may include a thin or "lite" version of the CPE client software, thereby allowing the mobile device to format and send user action messages to the collection entity 330, such as via a TCP/IP connection over the prevailing transport (e.g., WiFi, WiMAX or cellular air interface, Ethernet connection, etc.) which is addressed to the collection entity 330 or a proxy thereof.

Dynamic Training Data—

The various aspects 412, 504 examined by the recommendation engine 250 and the tracking engine 604 may comprise aspects that are dynamic in nature. Thus, in one embodiment, rather than being represented by in a 0/1 manner, these aspects are represented in a dynamic training vector. Examples of dynamic aspects include names of actors, directors, writers, etc. They are considered "dynamic" in the present context since they are not amenable to a binary or similar numerical representation. Stated differently, one can say to a relative level of surety that a given movie has comedic aspects or not ("1" or "0" on "comedy", respectively), but short of listing every possible actor, director, writer, etc. as a separate aspect or attribute, one cannot express the actual value of these latter attributes using the aforementioned system. Where the population is known and of manageable size (e.g., run time of a movie falling in certain intervals such as: (i) <1 hour; (ii) ≥1 hour but <2 hours; and (iii) ≥2 hours), the different options can be represented by the aforementioned binary or similar scheme. However, due to the effectively limitless number of possible actors, directors, writers, etc., these quantities are unmanageable using this approach.

Figure 8:
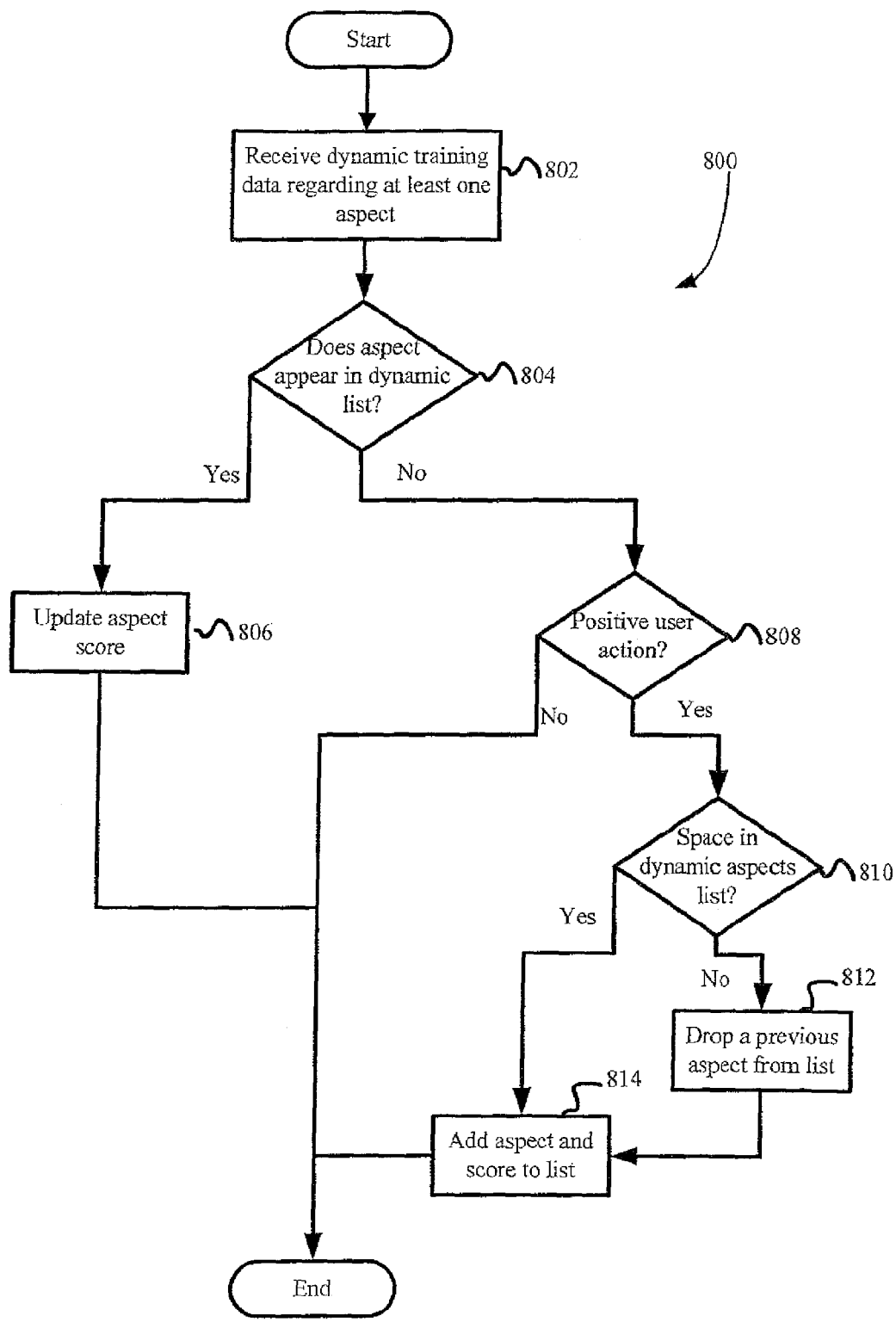
FIG. 8 is a logical flow diagram illustrating one embodiment of the method of maintaining a dynamic training list by a recommendation engine according to the present invention.

Referring now to FIG. 8, one embodiment of the method 800 by which the one or more applications of the recommendation engine 250 are adapted to maintain a dynamic training list is shown and described. As illustrated, at step 802, the recommendation engine 250 receives training data having at least one dynamic aspect 412, 504. In one embodiment, the dynamic training list may be adapted to only collect data for one type of content element over another; e.g., movies rather than for both movies and television series, as the latter generally tends to be identified more by its name or description rather than by its actors.

Per step 804, the application causes the recommendation engine 250 to determine whether the first new aspect appears in the dynamic aspect list associated with the user or CPE 106 to which the training data relates. Thus the recommendation engine 250 finds the appropriate dynamic aspect list, examines it for the presence of the first new aspect, and returns an answer.

If the first new aspect appears in the dynamic aspect list, at step 806, that aspect's score in the list will be updated based on the type of action (negative or positive) and the weight of the action as discussed above, such as using the system of Table 1.

If, however, the first new aspect does not appear in the dynamic aspect list, at step 808 the recommendation engine 250 determines whether the user action with respect to that aspect is positive in nature. If it is not (i.e., if the user action is negative in nature with respect to the aspect), the aspect will be discarded.

If the aspect is positive in nature, then, at step 810, the recommendation engine 250 determines whether there is space on the dynamic aspect list for the first new aspect. In other words, the recommendation engine 250 of the illustrated embodiment comprises software adapted to retain only a set number ("short list") of dynamic aspects of a certain category at one time. If that set number has not been met, the first new aspect is added to the list per step 814. If the prescribed number has already been met, then per step 812, the system will be adapted to drop a previous aspect from the list in favor of the first new aspect. In one embodiment, the aspect which has been present on the list for the longest period of time will be dropped. Then, the first new aspect is added to the list per step 814. Other substitution/purging schemes for the dynamic list may be used as well.

Exemplary dynamic aspect lists for actors (dynamic actor lists) 900 are given in FIG. 9. In the illustrated embodiment of part A of FIG. 9, the application is adapted to only retain 10 entries 902 in the actor category (other categories are not shown for sake of clarity). The exemplary dynamic actor list 900 also illustrate the scores 904 for each of the entries 902. As a viewer performs actions at his CPE 106 (or other device such as a remote client), these actions are reflected in the dynamic actor list 900.

Part B of FIG. 9 illustrates the effect that a user watching the movie "One Fine Day" (starring George Clooney and Michelle Pfeiffer) to completion has on the dynamic actor list 900 for that user, assuming the weight for watching a program to completion is +2 per Table 1. As illustrated, the recommendation engine 250 determines that the actor George Clooney was not previously on the list 900 (as given in part A). Then, because the activity regarding the movie is positive activity (i.e., watching it to completion), and because there is space on the list for a new entry 902, George Clooney is added to the dynamic actor list 900 with an appropriate score (+2.0) 904a.

Regarding the actress Michelle Pfeiffer, the recommendation engine 250 determines that she was previously on the list (as given in part A), and thus updates her score 904b given the weight associated with the user activity. Accordingly, the score 904b for Michelle Pfeiffer is updated from a 1.0 in part A to a 3.0 in part B.

Part C of FIG. 9 illustrates the effect that viewing the movie "North by Northwest" (starring Carey Grant) to completion has on the dynamic actor list 900 for the same user. As above, the exemplary embodiment supposes the weight for watching a program to completion is +2 As illustrated, the recommendation engine 250 determines that the actor Carey Grant is not previously on the list 900 (as given in parts A and B). Then, the recommendation engine 250 determines that the activity regarding the content is positive activity, and thus removes the oldest entry 902 from the list 900. In the illustrated embodiment of part B, the oldest entry is Janet Jones, who is removed from the list 900. Each of the remaining entries 902 moves up one spot on the list, and Carey Grant is added to the list 900 with an appropriate score (+2.0) 904c.

It is noted that, in an alternative embodiment, the system may be adapted to also take into account the score 904 of the oldest entry 902. If the oldest entry 902 has meets pre-set threshold score 904, the system will pass over that entry 902, in favor of removal of an entry with a lower score 902.

In one embodiment the maximum number of items in the dynamic list 900 is dependent on the system memory. Thus, the larger the system memory, the more items may be stored thereon, i.e., making the number of items configurable. In an alternative embodiment, the dynamic list is stored on disk and is read and written/re-written when needed rather than loaded in memory as discussed previously.

"Unlearning" Process—

A viewer's preferences are typically not static in nature—rather they change over time. As discussed above, the exemplary system "learns" from information collected regarding a user's actions. The exemplary system is also advantageously adapted to "unlearn" usage behavior by gradually downgrading the importance of certain training data.

First, as discussed above, user profiles 510 are updated constantly, and are cumulated. Both of these features enable the user profile 510 to precisely reflect user preferences, and urge the system away from retaining old training data (older data is weighted less heavily, and training data is given an expiration date).

Further, to prevent data staleness, one embodiment of the invention uses a purge mechanism. Specifically, when a particular aspect 412, 504 has not been updated for a certain period of time, it will be assumed that the aspect 412, 504 is no longer a factor in the content recommending process, and the "stale" value will be cleared (i.e., set to 0 or reset to the starter value 502).

It is also appreciated that the present invention may implement a system whereby a certain number of refusals of recommended content cause that content to be removed. For instance, the recommendation engine 250 might be programmed to remove content from further recommendation after five (5) instances of refusal, based on the assumption that such a number of refusals correlates to no user interest in that content (or even more strongly, a user's dislike of the content).

Lastly, "unlearning" will occur when a user takes certain actions which have a highly negative training impact on content. For example, stopping a recording midway, or navigating away after viewing content for a significant amount of time, both have highly "negative" connotations for content, and cause the existing training data to be decremented by negative values associated with those actions. Thus, if a user begins removing content of a particular genre and navigates away from content of that genre, gradually the preference for the genre will be completely removed.

Recommendation Process—

In one embodiment, a standard or static set of attributes is used to enable the system to "learn" a user's preferences. The standard set of attributes may be prefilled with default user preferences (e.g., starter or initial values 502) and, based on user actions (or inactions) the profile will immediately being to shift towards the actual user preferences.

As noted above, content is recommended to a user in the exemplary embodiment based on a comparison of the content record 400 of the content to the user's profile 510. Both the content record 400 and the user profile 510 are represented as vectors. To compare the vectors, in one embodiment, the dot product of the vectors is calculated, and if that product meets a certain minimum value, the content will be listed as "recommended" content.

The dot product of two vectors, a and b, is given by Eqns. 13-15 below.

$$a = [a_1, a_2, a_3 \ldots a_n] \quad \text{Eqn. 13}$$

$$b = [b_1, b_2, b_3 \ldots b_n] \quad \text{Eqn. 14}$$

$$a \cdot b = \Sigma_{i=1}^a a_i b_i = a_1 b_1 + a_2 b_2 + a_3 b_3 + \ldots + a_n b_n \quad \text{Eqn. 15}$$

An exemplary content record of the movie "The Sixth Sense", $V_{The\ Sixth\ Sense}$, and an accompanying reference vector, $V_r$, are given below.

$$V_{The\ Sixth\ Sense} = [0,0,0,1,0,0,0,1,0,1,0,0,1] \quad \text{Eqn. 16}$$

$$v_r = [\text{comedy,romance,action,horror},1970\text{'s},1980\text{'s},\\ 1990\text{'s,Hugh Grant,Bruce Willis,Broadcast,on}\\ \text{demand,DVR}] \quad \text{Eqn. 17}$$

Further, an exemplary user profile 510 is given by the vector, $V_{user\ profile}$ per Eqn. 18 below.

$$V_{user\ profile} = [4.2,3.3,0.2,5.7,6.0,2.2,4.1,6.2,1.3,0.7,7.3,\\ 8.0] \quad \text{Eqn. 18}$$

Presented in Eqns. 19-22 below is the calculation of the dot product of the exemplary content record 400 for the movie "The Sixth Sense" given the exemplary user profile 510 to generate a score for the movie based on the user profile 510.

$$Score_{\text{"The Sixth Sense"}} = \sum_{i=1}^{n} V_{\text{"The Sixth Sense"}} V_{\text{User Profile}} \quad \text{Eqn. 19}$$

$$Score_{\text{"The Sixth Sense"}} = \begin{bmatrix} (0)(4.2) + (0)(3.3) + (0)(0.2) + \\ (1)(5.7) + (0)(6.0) + (0)(2.2) + \\ (1)(4.1) + (0)(6.2) + (1)(1.3) + \\ (0)(0.7) + (0)(7.3) + (1)(8.0) \end{bmatrix} \quad \text{Eqn. 20}$$

$$Score_{\text{"The Sixth Sense"}} = [5.7 + 4.1 + 1.3 + 8.0] \quad \text{Eqn. 21}$$

$$Score_{\text{"The Sixth Sense"}} = 19.1 \quad \text{Eqn. 22}$$

As discussed, the score for the particular piece of content is examined against a threshold score. If the score for the particular piece of content is greater than the threshold, the content record will be stored on a "hit" list. The score of the next content examined will be placed on the list above or below that preceding it depending on its value compared to the preceding entries. Thus, if the first content evaluated by the engine 250 scored a score of 19.1, as above, and the second content examined scored a score of 10.2, the second would be placed below the first in the priority order of the list. Once the hit list is filled (based on e.g., a predetermined number of allowed entries, filled runtime, or other such criteria), the content record having the lowest score will be dropped from the list. The threshold may be a static number (e.g., the top 20) or, alternatively, the there may be a minimum number for each content type or based on several content aspects 412, 504 (e.g., at least three of each comedy, romance and action). It is also noted that in one embodiment, content meeting and/or exceeding a high threshold will be placed (by title) into a list for display to a user even though the content is only available at some time in the future.

In the context of the prior training data lists (parts A through C of FIG. 9), if the movie "Michael Clayton" with George Clooney and Tilda Swinton is being evaluated by the engine 250 subsequent to the update or part B of FIG. 9, it is going to receive a high recommendation score, since the system deduces that two favorite actors (as determined by their presence on the updated list of FIG. 9) are in the same movie.

Exemplary implementations of abbreviated algorithms for comparing broadcast TV, Movie On-Demand, Video On-Demand, and Pay-Per-View content to a user profile 510 are given in Appendix B hereto.

It is also appreciated that in another embodiment, the recommendation engine 250 is adapted to take into consideration the content source, and arrange items in the hit list according to a hierarchy of sources, so as to achieve one or more desired goals. These goals might be user-centric (e.g., to make the user experience and user interface as "logical" as possible, or to minimize costs or latency of delivery to the consumer), or alternatively MSO- or network-centric (e.g., reduce strain on network resources, optimize bandwidth usage, or optimize MSO revenue or profit). This feature trades in part on the fact that most people, when presented a prioritized list of possible choices, will tend to select the highest priority item (e.g., "best") item on the list first. Moreover, if the same content element is available via two or more different sources, then the user may be apprised of this fact via an indication (e.g., icon, highlighting, on-screen link, or selective regrouping) on the user interface. Where such cases exist, one delivery mode/source is generally always preferable from both the user's and the MSO perspective, based on e.g., the factors listed above.

The recommendation engine 250 may also take into account the order that related content was broadcast, such as in a television series, in order to recommend earlier episodes prior to more recent ones (which would come later in the progression of the series).

The recommendation engine 250 may also be adapted to search channels or sources to which the user does not subscribe, and make recommendations to the user as to whether they are likely to find content they would prefer on such a channel. Similarly, the recommendation engine 250 may be configured to never suggest channels or sources that are blocked or not subscribed to (as well as any content from such channels).

Along these lines, the recommendation engine may also be configured with restricted access to its recommendation and selection algorithms, such as via a PIN or password protection system or other such security measure. In this fashion, certain classes of users at a premises associated with a CPE 106 (e.g., minors) can be prevented from gaining access to the recommendation engine and playlist controls. In one embodiment, the parent can use their access privileges to configure the engine 250 so that all adult content (whether from subscribed sources or otherwise) is blocked or prevented from being placed on any user playlists for that premises. The description of content as being "adult" may be readily specified by accessing the content records for any prospectively recommended content for a "1" in the Adults Only genre field (see Appendix A), in the Sexual Content field, and so forth.

Given that one person's definition of certain types or content may not be the same as another's, the recommendation engine user interface (UI) may also contain a macro-function, soft-function key, or similar higher level process which, when selected by the user, automatically searches one or more prescribed fields to identify relevant content to be blocked. For example, in the case of the aforementioned "adult" content, the user interface may allow a user to create a macro which defines "adult" as having a "1" in the Adults Only or Sexual Content fields. This definition may be different than that of another user, the latter who may consider the "1" in the Sexual Content field too restrictive a definition for "adult" content. When invoked, the macro blocks from recommendation all content with a "1" in any of the specified fields. In another variant, a MSO- or third party-supplied definition of certain categories of content may be used, thereby alleviating the user of defining their own macros.

Additionally, the parent in the foregoing example might allow adult content for their own playlist(s) (e.g., "Dad's Playlist"), yet block access to the playlist itself via, for example, a password entry requirement when that playlist is selected via the on-screen display/remote control. In this fashion, the minors can neither access adult content via their own user profiles, nor "spoof" the engine 250 into thinking that they are actually their parents through use of the parent's profile(s).

Yet other schemes for restricting access to certain types of content will be recognized by those of ordinary skill given the present disclosure.

In another embodiment of the invention, the recommendation engine 250 is adapted to permit a user to store content (e.g., a set number of titles) as "favorites". The recommendation engine 250 may utilize this content in a number of different ways. For example, in one variant, the engine 250 selects content from the favorites list in a prescribed order (e.g., in ascending or descending lineal order, randomly, based on correlation/contextual matching to other content which is temporally proximate such as the last movie viewed by that user, etc.), and inserts these selections into the "hit"

list discussed above. The use of "favorite" material may be configured in any way the user desires; e.g., every $n^{th}$ content element recommended, once per day, upon user selection of a remote or UI option for "Pick a Favorite" or the like, only on certain days of the week or times of the day, and so forth. This approach in effect "short circuits" the normal recommendation engine processes, which may (given enough time) recommend the same content that is on the favorites list—rather, the user is now given direct access to these favorites when desired.

In yet another embodiment, the user is adapted to store "favorites" as well as "dislikes" by manual entry thereof. "Favorites" are given a positive weight; while "dislikes" are given a negative weight. For example, if a user indicates "American Idol" as a "dislike", the final recommendation score of "American Idol" (e.g. 19.1) will be reduced by a weighted number (e.g. 0.8, and becomes 18.3). Conversely, a positive weight of a "favorite" preference setting will bump the recommendation score up. Exemplary favorite/dislike settings, as disclosed above, may include, inter alia, actors, shows, ratings, genres, etc. In other words, the favorite/dislikes settings, entered by a user at a UI, are used in conjunction with the implicit training data collection disclosed above.

Related and/or Targeted Secondary Content Delivery—

In another embodiment, the recommendation engine 250 of the present invention may advantageously utilize various methods for the delivery and/or selection of targeted or related "secondary" content (e.g., advertising messages, useful informational links, etc.) occurring simultaneously with the delivery of recommended "primary" content (e.g., movies, broadcasts, etc.).

One approach to providing contextually related secondary content is to treat the secondary content effectively as primary content, with the basis of comparison however being the two content records (primary and secondary content). In this fashion, the recommendation engine generates a secondary content playlist, which represents the content which most closely matches the attributes of the primary content (and hence establishing a contextual relationship). For instance, if the theme of a recommended movie (primary) was related to golf, then the aforementioned process run by the recommendation engine 250 would generate a playlist of advertisements (secondary) which were also related in some way to golf (e.g., advertisements for the U.S. Open, auto advertisements with Tiger Woods, etc.).

Alternatively, the secondary content metadata (e.g., content records) can be compared or run against the user profile, just as the primary content records are in the embodiments described previously herein. This approach, however, will generally produce a playlist of secondary content which may correlate well with a user's likes or dislikes, yet which may or may not have any temporal contextual relationship to the primary content being recommended at a given time. In the case of the prior golf movie example, the same user might also have a strong affinity for auto racing, and the resultant secondary content playlist would contain advertisements for auto-related products or services, which bear no relationship to golf (other than both being sports).

One other method for the delivery of contextually-related secondary content in association with the primary content selected by the user and/or by the recommendation engine 250 is described in co-owned, co-pending U.S. patent application Ser. No. 11/198,620, filed Aug. 4, 2005 and entitled "Method and Apparatus for Context-Specific Content Delivery", which is incorporated herein by reference in its entirety. Specifically, secondary content comprising advertising is selected at least in part based on metadata associated with the primary content. The metadata is provided by, e.g., the content originator or network operator, and is sent to a third party network entity (e.g., advertising server) which returns contextually specific advertising matching the search terms. In one variant, the search term is simply one or more keywords drawn from the metadata and used as an input to a search engine (such as the aforementioned recommendation engine 601). In another variant, more sophisticated analysis of the metadata is performed so as to ostensibly reduce the number of irrelevant or marginally relevant "hits" returned by the search engine/advertising server.

Another method enhanced of advertising selection and delivery advantageously coupled with the aforementioned delivery of targeted primary content is described in co-owned, co-pending U.S. patent application Ser. No. 12/070,559, filed Feb. 19, 2008 and entitled "Method and Apparatus for Enhanced Advertising and Promotional Delivery in a Network", which is incorporated herein by reference in its entirety. Specifically, that application discusses a substantially user-friendly mechanism for viewing content and advertisements which both eliminates the guess-work and imprecision associated with skipping commercials via manual fast-forwarding through recorded content, and presents a viewer with options regarding the type and content of advertisements to view. Advertisers and network operators are also provided with more avenues for reaching subscribers with advertising or promotional content.

In one embodiment, the aforementioned network comprises a cable television network, and the methods and apparatus enable a viewer to individually preview and select the advertisements that they will view during real-time broadcast programming, as well as during "trick mode" operation in recorded program settings. In another embodiment, an advertising controller (AC) is utilized to select choices on the subscriber's advertising "playlist" based on, e.g., correlation between the advertising metadata and metadata associated with the programming content being viewed or recorded by the subscriber. This may likewise be accomplished by the recommendation engine 601 in manner which utilizes a user profile to create an advertising playlist similar to the manner discussed above. In another variant, advertising or commercial skipping may be substantially frustrated by presenting a viewer with several viewing options of potential interest, and/or imposing one or more minimum viewing policies.

In another embodiment, an advertising controller (AC) is utilized to select choices on the subscriber's advertising "playlist" based on, e.g., correlation between the advertising metadata and metadata associated with the programming content being viewed or recorded by the subscriber. This may likewise be accomplished by the user's recommendation engine 250 in manner which utilizes a user profile 510 to create an advertising playlist similar to the manner discussed above.

Accordingly, the recommendation engine 250 of the invention may be configured to use any of the foregoing approaches in selecting secondary content. The user may also advantageously be given control over the "fine tuning" of the engine and secondary content evaluation and recommendation algorithms. For instance, a user may not want contextually-related secondary content, but rather more of a "random" feel (while still being generally correlated to their interests). Other users may want the secondary content to be very tightly coupled and contextually related to the primary content, and even portions within the primary content. See, e.g., co-owned and co-pending U.S. Provisional Patent Application Ser. No. 60/995,655 entitled "METHODS AND APPARATUS FOR USER-BASED TARGETED CONTENT DELIVERY" filed Sep. 26, 2007, incorporated herein by reference in its entirety, which describes inter alia methods and apparatus for intra-content context-specific advertising placement useful with the present invention. Using this approach, targeted secondary content can be placed within particular portions of the primary content so as to most closely temporally align the contextually-related aspects of the advertisement and the primary content.

Other Media—

It is noted that the aforementioned apparatus and methods of recommending and delivering content may likewise be utilized for the recommendation of other media content including, inter alia, photos, music, etc. In one embodiment, these items carry their own metadata descriptions (which may be as simple as keywords in the title or description, such as a photo album of a user's trip to Japan entitled "Japan Trip Photos" or the like), which can be utilized in an analogous fashion to that of the primary (and secondary) content described previously herein.

Further, in one embodiment, other media content may be tied to broadcast, VOD, and DVR content to which it "relates". For example, the user's aforementioned electronic photo album of their vacation to Japan may trigger the recommendation engine 250 to suggest a documentary about Japanese culture, or a Japanese language movie, based on metadata comparison of the two. In another example, the presence of the song "Danger Zone" by Kenny Loggins in the user's music collection may trigger the recommendation engine 250 to recommend the movie "Top Gun", as this song appears in the soundtrack thereof.

The recommendation engine 250 may also be adapted to recommend other songs from the soundtrack of the recommended movie for purchase and/or download based on, e.g., the title and/or artist of these other songs. For instance, if the user's profile/actions with respect to content shows a strong selection of content relating to the band U2, and a given movie soundtrack contains a song by U2, then the movie might be recommended to the user on that basis.

Remote CPE, Playlist and DVR Control—

In yet another embodiment, a user may access his user profile 510 and/or the recommended content via the Internet or other MAN/WAN/internet. According to this embodiment, a user would be able to log into an MSO-operated website and by providing relevant information, be linked to his CPE 106 and its associated recommendation engine 250.

Figure 10A:
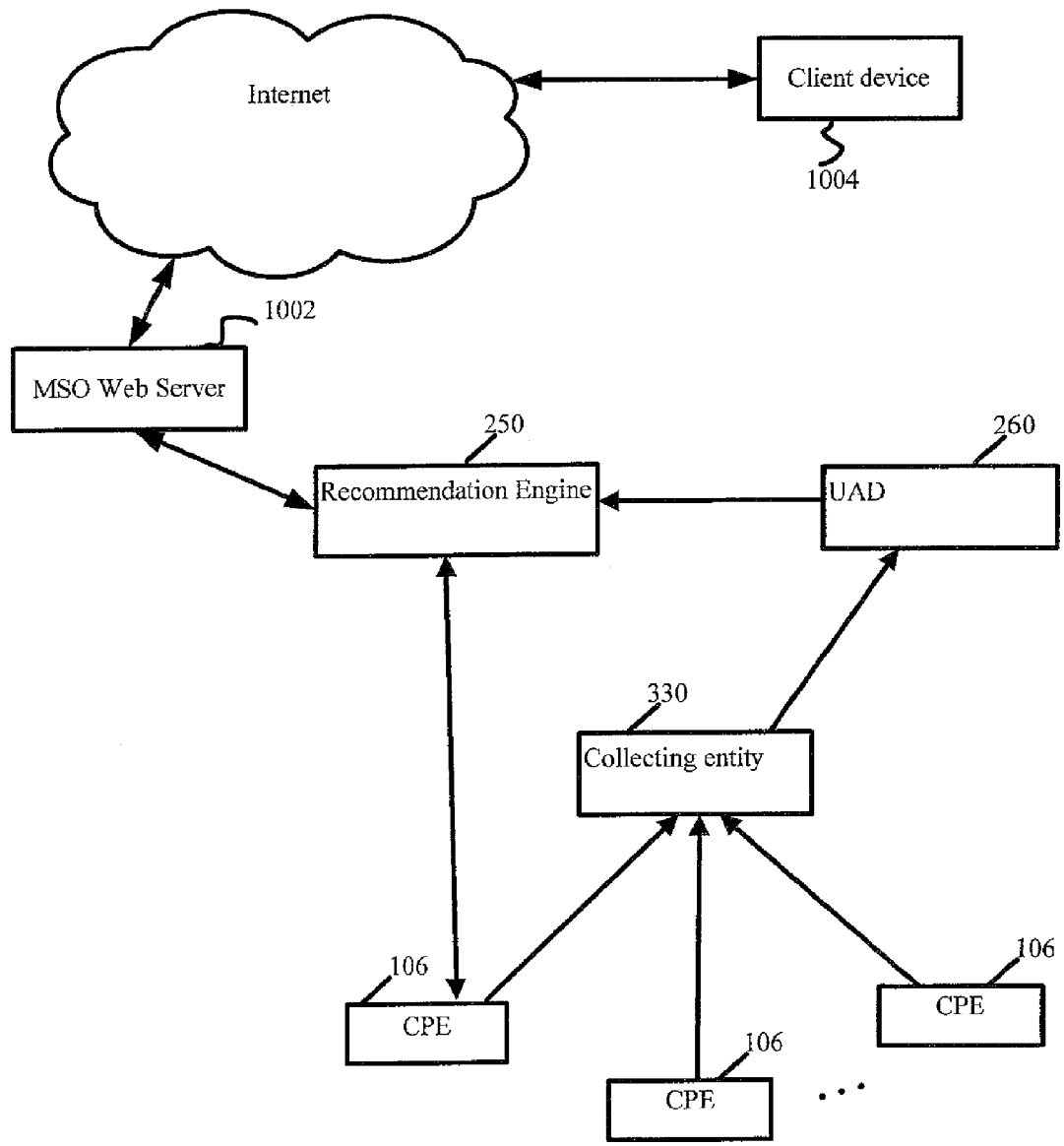
FIG. 10a is a block diagram of a remote access system architecture, wherein an MSO web server is in data communication with a network-based recommendation engine, according to one embodiment of the invention.

As illustrated in FIG. 10a, the MSO-operated website is run from an MSO web server 1002. The web server 1002 is in data communication with at least one recommendation engine 250, which is adapted to store user profiles 510 and generate recommendations for one or more CPE 106 via a collecting entity 330 (collecting user action data) and a UAD 260 (generating training data). According to this variant, a user will establish an Internet profile with the web server 1002, which enables the web server 1002 to associate the user to a CPE 106 and one or more user profiles 510 associated with the CPE or its subscribers. The recommendation engine 250 then periodically publishes a list of recommended content to the web server 1002 for each profile 510 for which an Internet profile has been established. The list is then made accessible via the Internet connection (e.g., TCP/IP transport) to the web server 1002 by a remote, Internet-capable client device 1004. Such devices may include, inter alia, personal computers, laptop computers, PDA, Internet-capable cellular telephones or smartphones, etc. Thus, a user may access recommended content lists via connection to the web server 1002 from an IC client device 1004 at literally any location worldwide.

Figure 10B:
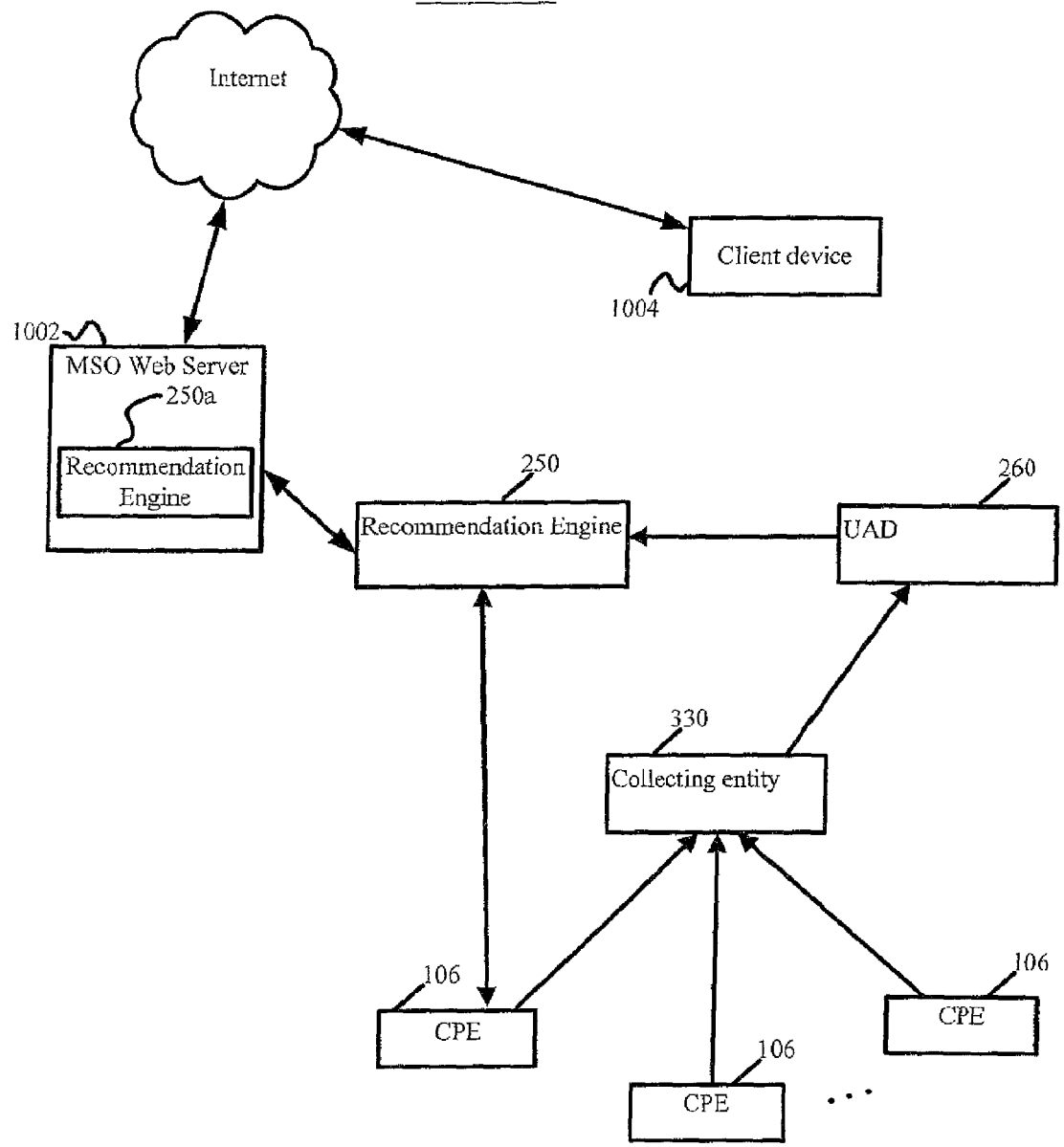
FIG. 10b is a block diagram of a remote access system architecture, wherein an MSO web server is in data communication with both a web-based recommendation engine and a network-based recommendation engine according to another embodiment of the invention.

In an alternative embodiment, illustrated in FIG. 10b, a recommendation engine 250a similar to that described above is run from the MSO web server 1002. Accordingly, the network recommendation engine 250, rather than publishing recommendations to the web server 1002 as above, publishes only the user profiles 510 it has stored. Then as above, a user establishes an Internet profile; the Internet profile indicating which of the user profiles 410 it is associated with. A component of the recommendation engine 250a running on the web server 1002 causes the server 1002 to send a list of recommended content (associated with the appropriate user profile 510) to the remote IC client device 1004.

Figure 10C:
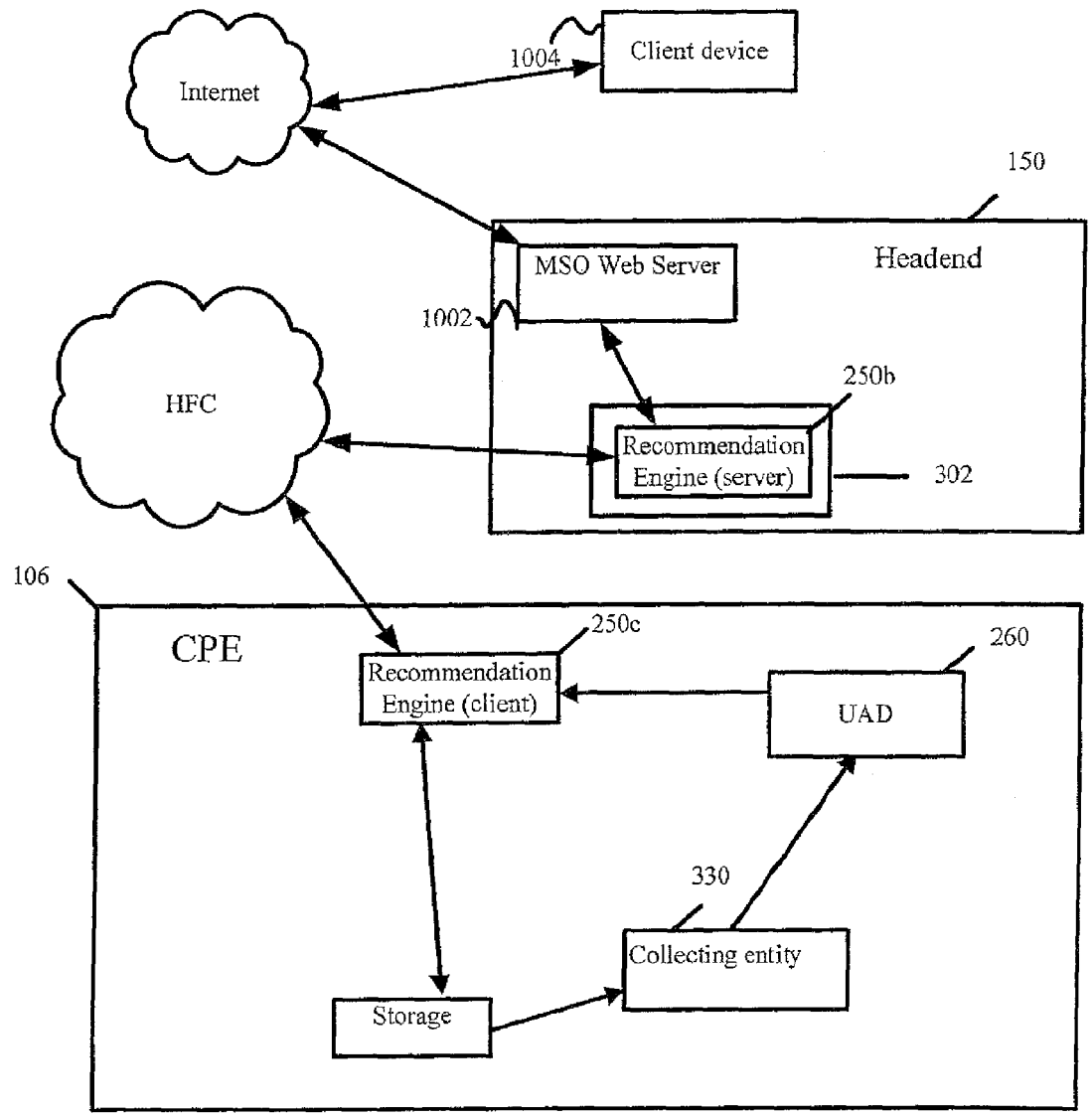
FIG. 10c is a block diagram of another embodiment of a remote access system architecture, wherein a client-server recommendation engine architecture is used, the client portion being disposed on a CPE.

In another embodiment (FIG. 10c), the recommendation engine comprises a client-server application having two components 250b, 250c disposed to run on the recommendation server 302 and CPE 106, respectively. The recommendation engine server portion 250b and MSO web server 1002 are disposed at the MSO headend 150, and the recommendation engine server portion 250b is in logical (process) communication with the client portion 250c disposed on the CPE 106 over the HFC network 101, such as via an in-band RF or OOB channel. In operation, the remote device 1004 communicates with the web server over the Internet (e.g., via TCP/IP transport), and the server portion of the engine 250b is tasked with communicating with the CPE 106 via its client engine portion 250c. The CPE 106 maintains the UAD 260 and the collecting entity 330; the server portion acts to feed the client portion 250c the necessary content metadata for processing, and to control operation of the client portion 250c (and related functions) remotely for the client device 1004.

Figure 10D:
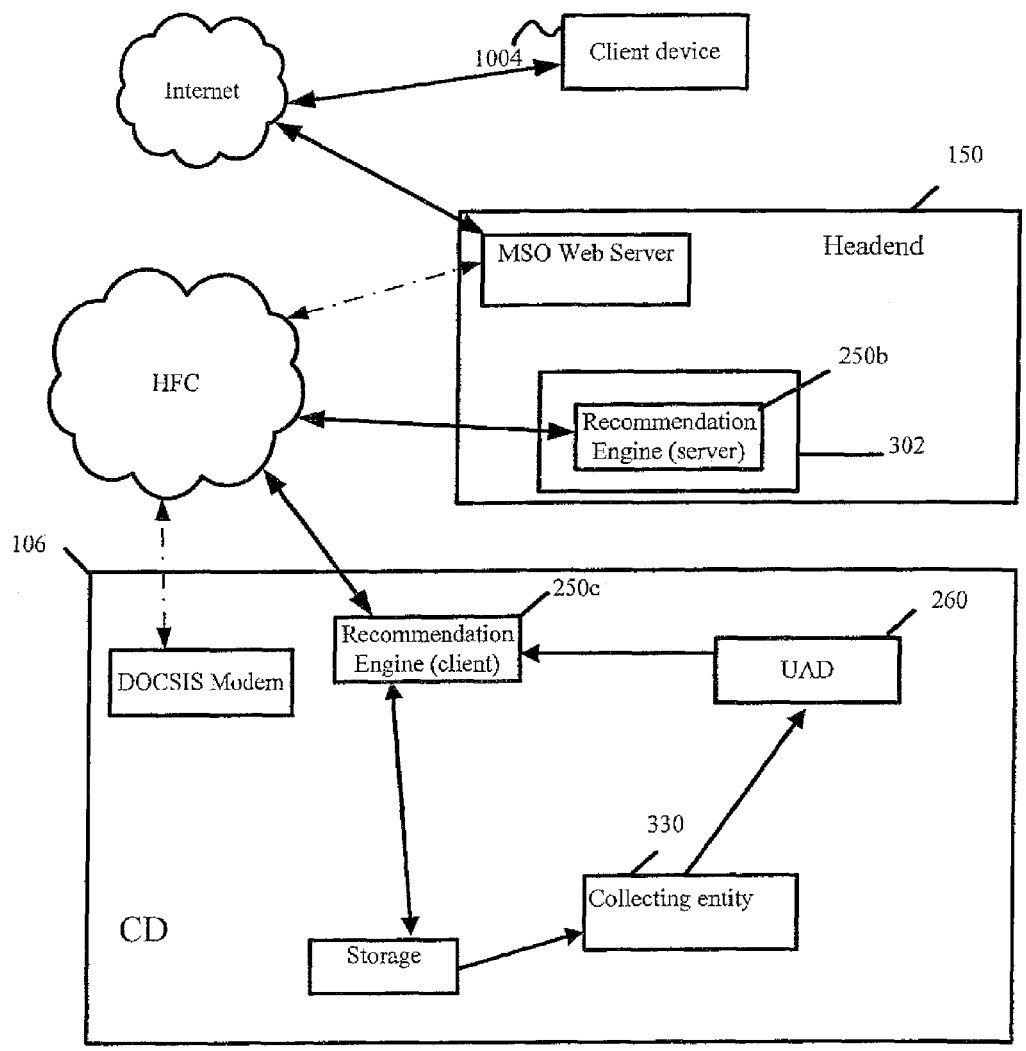
FIG. 10d is a block diagram of yet another embodiment of a remote access system architecture, wherein a client-server recommendation engine architecture is used, the client portion being disposed on a converged premises device (CD) which also includes a DOCSIS cable modem for communication with a remote client device.

FIG. 10d illustrates yet another alternative embodiment, wherein the MSO web server communicates with the CPE 106, in this case a converged premises device or CD, via a DOCSIS (cable modem) channel over the HFC network. The CD comprises an integrated cable modem, and hence communication between the remote device 1004 and the CD 106 is accomplished via a direct TCP/IP or similar transport (or via the MSO web server, acting as a proxy or gateway as illustrated in FIG. 10d), without involving the server portion of the recommendation engine 250b directly. Rather, control of the recommendation engine and related functions are handled directly between the client portion 250c and the remote client device 1004, and the server portion acts effectively as a slave to the client portion requests (e.g., for content metadata, etc.).

It will be recognized that the embodiments of FIGS. 10a-10d are merely illustrative in nature; many different permutations and configurations are possible. For example, the location of the UAD 260 or collecting entity 330 can be varied, as can the location of the MSO web server. Different transports and physical layers (e.g., wireless or wireline) can be utilized as well.

In the above-described embodiments, once a connection to the web server 1002 has been established, the user will be able to schedule programming to a personalized playlist for recording (i.e., recommend and select for recording programs which are recommended and broadcast while the user is not physically at his CPE 106). The website may also be configured to offer users the ability to remove recorded programs from the user's DVR, such as via a directory function (generally akin to well known peer-to-peer directory functions which allow viewing and manipulation of indigenous content directories), so as to open up space for the recording of other programs.

It is further noted that at the MSO-operated website (where used), a user may be access a future playlist. In other words, the user is able to view a playlist the recommendation engine 250 will generate at a particular date/time in the future. For example, a user can access the website at 12:00 pm on a given day and run a query to find out what programming the recommendation engine 250 will recommend at 8:30, 9:00, 9:30, 10:00, etc. that night. These future playlists will be generated and displayed to the user who may then create a modified playlist of the content from the future playlists he/she would like to view at those times, and have that modified playlist sent back to his CPE 106 for use when the user arrives at the premises later that day.

Business Methods and Considerations—

The variety of different functions and content "shaping" options provided by the recommendation engine 250 of the present invention also afford several opportunities for new or enhanced business models. Various business-related aspects of the engine, content and user records, and remote access features are now described in detail.

Specifically, in one embodiment, access and the ability to customize a user's recommendation engine functionality (such as by entering more specific user data, selecting certain content or classes of content for inclusion or removal, etc.) are provided as incentives or features as part of the subscriber's subscription plan. For instance, premium or new subscribers may be offered these features (either as a bundle, or in various grades) as an incentive or "teaser" to continue their subscription or upgrade it. Alternatively, subscribers may pay a fee for the additional capability, with one benefit being ostensibly better and more personalized recommendations for that user. With greater control or "fine tuning" comes greater precision in content recommendation, and user's may find this additional precision worthy of an additional fee, higher subscription rate or tier, etc.

Additionally, the parental control aspects previously herein (e.g., ability to block certain types of content from being recommended, password protection for various user profiles or playlists, etc.) may also be offered for a premium, or as part of an incentive package. This paradigm can also be readily extended into the enterprise or business arenas, such as to monitor/control employee content usage.

Similarly, the ability to access one's DVR and/or the recommendation engine 250 over an MSO operated website may be offered at a premium, or alternatively as a premium or new subscription or incentive feature.

Access to recommendations or playlists (hit lists) generated for other individuals may also be used by the MSO or content provider as a "value added" basis. For example, the MSO or content provider may have an arrangement with a celebrity whereby the playlists generated for that celebrity are periodically distributed to user's in the MSO network, such as for an additional monthly fee. In this fashion, subscribers would be advised of what their favorite celebrities might be watching at any given time. Similarly, different user profiles ranging from those based on one other individual, to those based on a large sampling of the subscriber base, or on a particular demographic, genre, time period, etc., could be accessed by a subscriber (such as where a friend's playlist is accessible, with their permission). The playlist "package" afforded to a given subscriber might be based on subscription level for example; i.e., premium subscribers would receive the widest range of profiles/playlists, while those at lower subscription levels would receive a smaller or more restricted set.

The provision of descriptive metadata for primary, secondary, or other content (e.g., music, photos, etc.) for use by the recommendation engine also gives rise to potential business opportunities. For example, a third party may provide the service of receiving content, generating the descriptive metadata file(s) for that content, and forwarding the latter on to a content source (e.g., network, MSO, etc.) for consideration. Likewise, users could send their content (home movies, music compilations, photo albums, etc. to such a service provider in order to have descriptive metadata generated therefor.

A home "metadata generator" software environment might also be provided to a user (e.g., by the MSO), such that users could generate their own descriptive terms for their content, or aspects that are of particular importance to them. For instance, were a user to send their photo albums of their trip to Japan to a third party for generation of metadata, the metadata produced would often tend to be generic in nature. In contrast, by allowing a user to generate the descriptive data themselves, more precise and ostensibly useful metadata would result; e.g., "Uncle Ron and Mom at Tokyo sushi house before departure" versus "Man and woman eating at restaurant" for a given photograph from the aforementioned trip to Japan. In this example, if the user were later interested in all things within their content collection that relate to Uncle Ron or sushi, the more descriptive metadata generated by the home software environment would return the photo of interest as a search result, whereas the generic third-party metadata would not.

Operations/Business Rules Engine—

In another aspect of the invention, the aforementioned recommendation engine 250 (rendered as one or more computer programs disposed on e.g., the recommendation server 302 and/or the CPE 106) includes a so-called "rules" engine. These rules may be fully integrated within various entities associated with the present invention, or may be associated with the recommendation engine 250 itself, and controlled via e.g., the aforementioned MSO or user interfaces to the engine, UAD, and collection entity as applicable. In effect, the rules engine comprises a supervisory entity which monitors and selectively controls the content recommendation functions at a higher level, so as to implement desired operational or business rules. The rules engine can be considered an overlay of sorts to the recommendation and playlist/EPG population algorithms. For example, the recommendation engine 250 may make certain recommendations or playlist collections based on the user profile(s) of interest and the metadata associated with particular content elements. However, these recommendations may not always be compatible with higher-level business or operational goals, such as lowest cost to user, maximizing MSO profit/revenue, best use of network resources, or system reliability. Hence, when imposed, the business/operational rules can be used to dynamically and transparently (or manually) control the operation of the recommendation engine 250. The rules may be, e.g., operational or business-oriented in nature, or related to preservation of security, and may also be applied selectively in terms of time of day, duration, specific local areas, or even at the individual premises or user level.

For example, where two content elements are effectively equal in relevance or rating for a given user profile ("don't care"), profitability or revenue information associated with the two choices can be evaluated to determine which selection is likely to produce more revenue or profit for the MSO or a third party (e.g., advertiser), or alternatively the lowest cost to the subscriber. Similarly, acquisition costs (e.g., RTA) for the various options may also be considered. Such rules can also be applied such as to outweigh or overturn recommendations by the engine.

Moreover, different aspects of the content, user, and network can be included within the recommendation engine so as to impose desired operational or business rules. For example, the engine 250 might perform a three-faceted analysis for generating recommendations: (i) matching content metadata to a user profile, as discussed at length previously herein; (ii) evaluating the revenue, cost, and/or profitability aspects of various alternatives; and (iii) evaluating operational considerations (such as latency for delivery of content, reliability, QoS of the delivered content, user satisfaction, need for transcoding, etc.). The results of these three analyses might then be used as input to a weighted "scoring" algorithm that generates a composite score for each piece of content; the playlist can then be assembled based simply on highest-to-lowest score (or some other such scheme).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

APPENDIX A

© Copyright 2008-2009 Time Warner Cable, Inc. All rights reserved.

| Aspect | Category | Aspect | Category |
|---|---|---|---|
| Paid Programming | Content Type | Nudity | Advisory Rating |
| Feature Film | Content Type | Brief Nudity | Advisory Rating |
| TV Movie | Content Type | Mild Violence | Advisory Rating |
| Special | Content Type | Strong Sexual Content | Advisory Rating |
| Series | Content Type | Adult Situations | Advisory Rating |
| Limited Series | Content Type | Adult Language | Advisory Rating |
| Miniseries | Content Type | No Advisories | Advisory Rating |
| Sports non-event | Content Type | Sexual Content | Advisory Rating |
| Sports event | Content Type | Explicit Language | Advisory Rating |
| Local | Content Type | Strong Dialog | Advisory Rating |
| On Demand | Content Type | Graphic Language | Advisory Rating |
| Short Film | Content Type | | |
| Show | Content Type | Dark comedy | Genre |
| High Definition | Content Type | Docudrama | Genre |
| Action | Genre | Documentary | Genre |
| Adults only | Genre | Drama | Genre |
| Adventure | Genre | Entertainment | Genre |
| Agriculture | Genre | Environment | Genre |
| Alternative | Genre | Erotic | Genre |
| Lifestyles | | Event | Genre |
| Animals | Genre | Family | Genre |
| Animated | Genre | Fantasy | Genre |
| Anthology | Genre | Fashion | Genre |
| Art | Genre | Film noir | Genre |
| Awards | Genre | Football | Genre |
| Baseball | Genre | Game show | Genre |
| Basketball | Genre | Golf | Genre |
| Biography | Genre | Health | Genre |
| Boxing | Genre | Historical drama | Genre |
| Business | Genre | History | Genre |
| Children | Genre | Hockey | Genre |
| Classic | Genre | Holiday | Genre |
| Comedy | Genre | Horror | Genre |
| Cooking | Genre | House/Garden | Genre |
| Crime | Genre | How-to | Genre |
| Dialog | Advisory Rating | International | Genre |
| Fantasy Violence | Advisory Rating | Learning | Genre |
| Language | Advisory Rating | Music | Genre |
| Sex | Advisory Rating | Musical | Genre |
| Violence | Advisory Rating | Mystery | Genre |
| Graphic Violence | Advisory Rating | Nature | Genre |
| News | Genre | TV-Y | Rating Flag |
| Outdoors | Genre | TV-Y7 | Rating Flag |
| Parenting | Genre | TV-G | Rating Flag |
| Repeat | Qualifier | G | Rating Flag |
| Letterbox | Qualifier | TV-PG | Rating Flag |
| HDTV | Qualifier | PG | Rating Flag |
| Closed Captioned | Qualifier | PG-13 | Rating Flag |
| Enhanced | Qualifier | TV-14 | Rating Flag |
| Stereo | Qualifier | TV-MA | Rating Flag |
| Dolby | Qualifier | R | Rating Flag |
| SAP | Qualifier | NC-17 | Rating Flag |
| DVS | Qualifier | AO | Rating Flag |
| EI | Qualifier | en | Dubbed |
| New Release | Qualifier | es | Dubbed |
| Has Preview | Qualifier | cn | Dubbed |
| Has Subtitle | Qualifier | fr | Dubbed |
| Dubbed | Qualifier | de | Dubbed |
| en | Broadcast Language | jp | Dubbed |
| es | Broadcast Language | 0.5 Star | Star Rating |
| cn | Broadcast Language | 1 Star | Star Rating |
| fr | Broadcast Language | 1.5 Stars | Star Rating |
| de | Broadcast Language | 2 Stars | Star Rating |
| jp | Broadcast Language | 2.5 Stars | Star Rating |
| People | Genre | 3 Stars | Star Rating |
| Performing arts | Genre | 3.5 Stars | Star Rating |
| Public affairs | Genre | 4 Stars | Star Rating |
| Racing | Genre | Not Rated | Star Rating |
| Reality | Genre | en | Subtitle |
| Religious | Genre | es | Subtitle |
| Romance | Genre | cn | Subtitle |
| Science fiction | Genre | fr | Subtitle |
| Shopping | Genre | de | Subtitle |
| Sitcom | Genre | jp | Subtitle |
| Soap | Genre | | |
| Sports | Genre | | |
| Suspense | Genre | | |
| Talk show | Genre | | |
| Thriller | Genre | | |
| Travel | Genre | | |
| Variety | Genre | | |
| War | Genre | | |
| Weather | Genre | | |
| Western | Genre | | |
| No Rating | Rating Flag | | |

APPENDIX B

© Copyright 2008-2009 Time Warner Cable, Inc. All rights reserved.

A. Preprocessing

1) Whenever the system receives a new batch of guide data or MOD/VOD assets, the data will first be preprocessed for those that only need to be generated once, i.e. independent of users' profiles:

"Find Similar" List (for MOD assets)—every asset is associated with a list of assets that are most similar in attributes to the target asset.

2) DVR content do not changed until deleted. Therefore, they will be processed for recommendation as soon as the Scheduled-for-Recording user action is captured.

B. Main Processing

1) Broadcast TV Content—

Broadcast TV content are sorted into 8 groups to facilitate recommendation generation for daypart profiles: Weekday_Morning, Weekday_Afternoon, Weekday_primetime, Weekday_Latenight, Saturday_Morning, Sunday_Morning, Weekend_Afternoon, Weekend_Primetime and Weekend_Latenight.

The abbreviated algorithm looks like:

```
For each daypart user profile
    For each content in daypart group
        If content is not a movie
            Applying the user's daypart training profile -
            Recommendation Score = MatchedFixedAttr score +
            MatchedDynamicAttr Score
            Where:
                MatchedFixedAttr Score = Sum of matched
    fixed attr values / fixed training attr count
                MatchedDynamicAttr Score = sum of matched
    dynamic attr values / dynamic attr count
        Else if content is a feature film
            Applying the user's Movie training profile -
            Recommendation Score = MatchedFixedAttr
            score + MatchedDynamicAttr Score
            Where:
                MatchedFixedAttr Score = Sum of matched
    fixed attr values / fixed training attr count
                MatchedDynamicAttr Score = sum of matched
    dynamic attr values / dynamic attr count
        End for
    End for
    For each half hour time slot per day
        Select the top 10 content that have the highest
        recommendation scores and store them in the
        recommendation database.
        End for
```

2) Movie on Demand

MOD content are processed using the same algorithm as Broadcast TV, using a different training profile, i.e. the Movie profile.

```
For each MOD asset
    Applying the user's Movie training profile
        Recommendation Score = MatchedFixedAttr
        score + MatchedDynamicAttr Score
        Where:
            MatchedFixedAttr Score = Sum of matched
    fixed attr values / fixed training attr count
            MatchedDynamicAttr Score = sum of
    matched dynamic attr values / dynamic attr count
    End for
    Store all recommendations in the database
```

3) Video on Demand (Non-Movie)

VOD assets are processed using the same algorithm as Broadcast TV and also using the same daypart user profiles.

```
For each daypart user profile
    For each non-movie VOD asset
        Applying the user's daypart training profile -
        Recommendation Score = MatchedFixedAttr
        score + MatchedDynamicAttr Score
        Where:
            MatchedFixedAttr Score = Sum of matched fixed
    attr values / fixed training attr count
            MatchedDynamicAttr Score = sum of matched
    dynamic attr values / dynamic attr count
        End for
        Store the top 10 recommendations for the daypart
    in the recommendation database
        End for
```

4) Pay-Per-View

PPV assets are processed the same way as Broadcast TV content. They are sorted into 8 groups to facilitate generating recommendations for daypart profiles: Weekday_Morning, Weekday_Afternoon, Weekday_primetime, Weekday_Latenight, Saturday_Morning, Sunday_Morning, Weekend_Afternoon, Weekend_Primetime and Weekend_Latenight.

```
For each daypart user profile
    For each PPV asset in daypart group
        If content is not a movie
            Applying the user's daypart training profile -
            Recommendation Score = MatchedFixedAttr
            score + MatchedDynamicAttr Score
            Where:
                MatchedFixedAttr Score = Sum of matched
    fixed attr values / fixed training attr count
                MatchedDynamicAttr Score = sum of matched
    dynamic attr values / dynamic attr count
        Else if content is a feature film
            Applying the user's Movie training profile -
            Recommendation Score = MatchedFixedAttr
            score + MatchedDynamicAttr Score
            Where:
                MatchedFixedAttr Score = Sum of matched
    fixed attr values / fixed training attr count
                MatchedDynamicAttr Score = sum of matched
    dynamic attr values / dynamic attr count
        End for
    End for
    For each half hour time slot per day
        Select the top 10 content that have the highest
        recommendation scores and store them in the
        recommendation database.
    End for
```

What is claimed is:

1. For use in a content delivery network, a recommendation apparatus comprising:
   a storage device adapted to:
      store a plurality of information regarding a plurality of content elements expressed as n×1 column vectors, said n×1 column vectors each comprising a number, n, of aspects;
      store a plurality of user profiles expressed as n×1 column vectors, said n×1 column vectors each comprising a number, n, of aspects; and
      store an n×1 column reference vector configured to define each of said n aspects as expressed in said plurality of content element vectors and said plurality of user profile vectors, where n is more than one; and a digital processor in data communication with said storage device and adapted to run a computer program thereon, said computer program adapted to:
compare said plurality of content element column vectors to individual ones of said plurality of user profile column vectors; and
based at least in part on said comparison, produce at least one list of a plurality of content elements, said each of said plurality of content elements bearing a relationship to at least one of said plurality of user profiles.

2. The recommendation apparatus of claim 1, wherein said recommendation apparatus comprises a headend entity of said network.

3. The recommendation apparatus of claim 1, wherein said recommendation apparatus comprises a hub entity of said network.

4. The recommendation apparatus of claim 1, wherein said recommendation apparatus comprises a consumer premises device.

5. The recommendation apparatus of claim 1, wherein said aspects each comprise one or more aspects corresponding to metadata associated with individual ones of said plurality of content elements.

6. The recommendation apparatus of claim 5, wherein said comparison of said plurality of content element column vectors to said plurality of user profile column vectors comprises calculation of a dot product of individual ones of said content element column vectors and individual ones of said user profile column vectors to produce a scalar quantity.

7. The recommendation apparatus of claim 6, wherein said at least one list of content comprises a list of content having said scalar quantity greater than or equal to a preset real-value number, and said list being provided to a client device associated with said at least one user profile.

8. The recommendation apparatus of claim 1, wherein said list comprises information for identification and retrieval of each of said content in said list.

9. The recommendation apparatus of claim 1, wherein at least one of said plurality of user profiles comprises a template user profile.

10. The recommendation apparatus of claim 5, wherein said program is further adapted to update said at least one user profile via addition of a training vector to individual ones of said user profile column vectors, said training vector comprising weighted data regarding one or more user actions.

11. A method of identifying content targeted to a user based on one or more actions of said user, said method comprising:
maintaining a user profile expressed as a vector at a storage apparatus of a recommendation apparatus, said user profile being specific to said user;
generating at a processor of said recommendation apparatus, a first plurality of content records expressed as vectors, said first plurality of content record vectors being based, at least in part, on metadata regarding a plurality of content, each of said first plurality of content record vectors, and said user profile vector each having identical numbers of both columns and rows as one another;
providing access to said plurality of content to said user;
storing a user activity vector at said storage apparatus, said user activity vector comprising information relating to at least one action taken by said user with respect to an individual one of said plurality of content;
generating at said processor of said recommendation engine, a second plurality of content record vectors, individual ones of said second plurality of content record vectors each comprising a weighted content record of said content acted upon by said user expressed as a vector;
utilizing said individual ones of said second plurality of content record vectors at least in part to generate a second user profile vector;
calculating a product of said individual ones of said second plurality of content record vectors to said second user profile vector to produce a scalar quantity; and
said recommendation engine identifying individual ones of said plurality of content having a prescribed relation to an updated user profile based at least in part on said scalar quantity.

12. The method of claim 11, wherein said user profile comprises a pre-set or template user profile.

13. The method of claim 11, wherein said plurality of content record vectors and said user profile vector are expressed as n×1 column vectors; and said method further comprises storing a n×1 column reference vector defining aspects expressed in said plurality of content record vectors and said user profile vector.

14. The method of claim 11, wherein said act of generating said second plurality of content record vectors comprises multiplying said content record vectors associated with said at least one act by a weighting factor.

15. The method of claim 11, wherein said act of identifying individual ones of said plurality of content having a prescribed relation to said updated user profile based at least in part on said scalar quantity comprises identifying individual ones of said second plurality of content vectors having a scalar quantity equal to or greater than a predetermined value.

16. The method of claim 11, further comprising displaying identifying information regarding said identified individual ones of said plurality of content having a prescribed relation to said updated user profile.

17. Computer readable apparatus comprising media adapted to contain a computer program having a plurality of instructions, said plurality of instructions which, when executed:
maintain at least one user profile;
generate a plurality of content records via at least metadata relating to a respective plurality of content;
provide access to said plurality of content to a user;
store a record of at least one act taken by said user with respect to an individual one of said plurality of content;
multiply an individual one of said plurality of content records associated with said individual one of said plurality of content by a weighting factor determined by a nature of said act and an estimated relation of said act to one or more user preferences to generate a second content record; and
add said second content record to said user profile to generate a second user profile.

18. The computer readable apparatus of claim 17, wherein said user profile comprises a pre-set or template user profile.

19. The computer readable apparatus of claim 17, wherein said plurality of content records and said user profile are expressed as vectors having identical numbers of columns and rows as one another and said plurality of instructions are further configured to, when executed, compare first attributes of said second user profile to substantially equivalent first attributes of individual ones of said plurality of content records to identify individual ones thereof having a prescribed level of relatedness thereto.

20. The computer readable apparatus of claim 19, wherein said comparison of said second user profile to individual ones of said content records comprises calculation of a dot product of individual ones of said content records to said user profile to produce a scalar quantity.

21. The computer readable apparatus of claim 20, wherein said identification of said individual ones of said plurality of content having a prescribed level of relatedness comprises identification of individual ones of said plurality of content having a scalar quantity equal to or greater than a predetermined value.

22. Computer readable apparatus comprising media adapted to contain a computer program having a plurality of instructions, said plurality of instructions which, when executed:

maintain a user profile expressed as a vector at a storage apparatus of a recommendation apparatus, said user profile configured to be specific to a user;

generate at a processor of said recommendation apparatus, a first plurality of content records expressed as vectors, said first plurality of content record vectors being based, at least in part, on metadata which relates to a plurality of content, each of said first plurality of content record vectors, and said user profile vector each comprise identical numbers of both columns and rows as one another;

provide access to said plurality of content to said user;

store a user activity vector at said storage apparatus, said user activity vector comprises information which relates to at least one action taken by said user with respect to an individual one of said plurality of content;

generate at said processor of said recommendation engine, a second plurality of content record vectors, individual ones of said second plurality of content record vectors each comprise a weighted content record of said content acted upon by said user expressed as a vector;

utilize said individual ones of said second plurality of content record vectors at least in part to generate a second user profile vector;

calculate a product of said individual ones of said second plurality of content record vectors to said second user profile vector to produce a scalar quantity; and identify individual ones of said plurality of content which comprises a prescribed relation to an updated user profile based at least in part on said scalar quantity.

23. The computer readable apparatus of claim 22, wherein said user profile comprises a pre-set or template user profile.

24. The computer readable apparatus of claim 22, wherein said plurality of content record vectors and said user profile vector are expressed as n×1 column vectors; and said plurality of instructions are further configured to, when executed, store a n×1 column reference vector which defines aspects expressed in said plurality of content record vectors and said user profile vector.

25. The computer readable apparatus of claim 22, wherein said generation of said second plurality of content record vectors comprises multiplication of said content record vectors associated with said at least one act by a weighting factor.

26. The computer readable apparatus of claim 22, wherein said identification of individual ones of said plurality of content comprise a prescribed relation to said updated user profile based at least in part on said scalar quantity comprises identification of individual ones of said second plurality of content vectors which comprise a scalar quantity equal to or greater than a predetermined value.

27. The computer readable apparatus of claim 22, wherein said plurality of instructions are further configured to, when executed, display identification information which relates to said identified individual ones of said plurality of content which comprise a prescribed relation to said updated user profile.

* * * * *